(12) United States Patent
Curley et al.

(10) Patent No.: US 6,433,935 B2
(45) Date of Patent: *Aug. 13, 2002

(54) DISPLAY ILLUMINATION SYSTEM

(75) Inventors: Michael J. Curley, Mountain View; Chih-Li Chuang, Los Altos; Zheng-Wu Li; Gregory J. Kintz, both of Mountain View, all of CA (US)

(73) Assignee: Three-Five Systems, Inc., Tempe, AZ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/394,014

(22) Filed: Sep. 10, 1999

Related U.S. Application Data

(63) Continuation-in-part of application No. 09/372,651, filed on Aug. 11, 1999, now Pat. No. 6,055,110, which is a continuation-in-part of application No. 09/237,996, filed on Jan. 26, 1999, now Pat. No. 5,595,781, which is a continuation of application No. 08/033,208, filed on Mar. 2, 1998, now Pat. No. 5,892,624, which is a continuation of application No. 08/673,894, filed on Jul. 2, 1996, now Pat. No. 5,771,124.

(51) Int. Cl.$^7$ .............................................. G02B 27/14

(52) U.S. Cl. ....................................... 359/630; 359/633

(58) Field of Search .............................. 359/630, 631, 359/633, 634, 638; 345/7, 8, 9

(56) References Cited

U.S. PATENT DOCUMENTS

| 3,296,509 A | 1/1967 | Katchman | 317/258 |
|---|---|---|---|
| 3,758,196 A | 9/1973 | Weiss | 350/241 |
| 4,082,432 A | 4/1978 | Kirshner | 350/174 |

(List continued on next page.)

FOREIGN PATENT DOCUMENTS

| EP | 004033 A1 | 11/1981 | G02B/5/30 |
|---|---|---|---|
| EP | 0 351 967 A2 | 1/1990 | G02B/27/00 |
| EP | 0 520 340 A2 | 12/1992 | G02B/27/00 |
| EP | 0 566 000 A1 | 10/1993 | G02B/27/00 |
| EP | 0 566 001 A2 | 10/1993 | G02B/27/00 |
| EP | 0 566 002 A2 | 10/1993 | G02B/27/00 |
| FR | 2 693 004 A1 | 12/1993 | G02B/27/30 |
| GB | 2 004 383 A | 3/1979 | G02B/27/28 |
| GB | 2 182 456 A | 5/1987 | G02B/27/00 |
| WO | WO 96/36898 | 11/1996 | G02B/27/01 |

OTHER PUBLICATIONS

Isamu, O. et al., "Projection Type Displaying Device", Patent Abstracts of Japan, vol. 017, No. 320, 17 Jun. 1993 (JP 05034629, dtd 12 Feb. 1993).

"HUD Turn Signal Reminder", Research Disclosure, No. 303, Jul. 1989, Nerw York, 1 p.

Young, "Head–Mounted Display", IBM Technical Disclosure Bulletin, vol. 25, No. 12, pp. 6373–6374 (May 1983).

Handbook of Optics, vol. 1, Fundamentals, Techniques and Design, 2$^{nd}$ Edition, McGraw–Hill, Inc. Chapt. 30.4, 30.5, 1.89, 32.10 (1995).

Pedrotti, F. J. Introduction of Optics, Prentice Hall, pp. 50, 52–53, 140 (1993).

Pedrotti, F. L., "Introduction to Optics", Prentice Hall, pp. 137–138 (1993).

(List continued on next page.)

*Primary Examiner*—Ricky Mack
(74) *Attorney, Agent, or Firm*—Baker Botts L.L.P.

(57) ABSTRACT

A virtual image display system is provided which comprises a non-emissive, reflective microdisplay which forms a source object; an optical system which forms a magnified, virtual image of the source object from light reflected off the microdisplay; a light source system which produces light to illuminate the display system; and an illumination system which forms at least two virtual light sources to illuminate the display system.

57 Claims, 14 Drawing Sheets

U.S. PATENT DOCUMENTS

| | | | |
|---|---|---|---|
| 4,082,440 A | 4/1978 | Bennett | 353/26 |
| 4,099,831 A | 7/1978 | Freeman | 350/9 |
| 4,361,384 A | 11/1982 | Bosserman | 350/174 |
| 4,717,248 A | 1/1988 | LaRussa | 350/618 |
| 4,728,185 A | 3/1988 | Thomas | 353/122 |
| 4,832,427 A | 5/1989 | Nanba et al. | 350/3.72 |
| 4,859,031 A | 8/1989 | Berman et al. | 350/174 |
| 4,900,133 A | 2/1990 | Berman | 350/346 |
| 4,925,272 A | 5/1990 | Ohshima et al. | 350/174 |
| 4,999,012 A | 3/1991 | Suzuki et al. | 353/14 |
| 5,050,966 A | 9/1991 | Berman | 359/38 |
| 5,087,116 A | 2/1992 | Taylor, II | 359/851 |
| 5,091,739 A | 2/1992 | Kawamura | 396/384 |
| 5,121,099 A | 6/1992 | Hegg et al. | 340/461 |
| 5,157,503 A | 10/1992 | Dugdale | 358/238 |
| 5,189,512 A | 2/1993 | Cameron et al. | 358/93 |
| 5,224,198 A | 6/1993 | Jachimowicz et al. | 385/133 |
| 5,291,338 A | 3/1994 | Bezard et al. | 359/859 |
| 5,303,085 A | 4/1994 | Rallison | 359/631 |
| 5,305,124 A | 4/1994 | Chern et al. | 359/13 |
| 5,323,477 A | 6/1994 | Lebby et al. | 385/129 |
| 5,334,991 A | 8/1994 | Wells et al. | 345/8 |
| 5,351,151 A | 9/1994 | Levy | 359/240 |
| 5,357,372 A | 10/1994 | Chen et al. | 359/637 |
| 5,363,241 A | 11/1994 | Hegg et al. | 359/676 |
| 5,369,415 A | 11/1994 | Richard et al. | 345/6 |
| 5,383,053 A | 1/1995 | Hegg et al. | 359/486 |
| 5,386,216 A | 1/1995 | Iino | 345/7 |
| 5,394,203 A | 2/1995 | Murphy et al. | 353/13 |
| 5,418,584 A | 5/1995 | Larson | 353/122 |
| 5,422,653 A | 6/1995 | Maguire, Jr. | 345/9 |
| 5,422,758 A | 6/1995 | Lawson | 359/634 |
| 5,426,521 A | 6/1995 | Chen et al. | 359/9 |
| 5,457,575 A | 10/1995 | Groves et al. | 359/631 |
| 5,467,104 A | 11/1995 | Furness, III et al. | 345/8 |
| 5,467,205 A | 11/1995 | Kuba et al. | 359/40 |
| 5,467,215 A | 11/1995 | Lebby et al. | 359/247 |
| 5,479,224 A | 12/1995 | Yasugaki et al. | 353/101 |
| 5,483,307 A | 1/1996 | Anderson | 353/98 |
| 5,485,318 A | 1/1996 | Lebby et al. | 359/811 |
| 5,486,946 A | 1/1996 | Jachimowicz et al. | 359/263 |
| 5,491,491 A | 2/1996 | Lebby et al. | 345/7 |
| 5,499,138 A | 3/1996 | Iba | 359/569 |
| 5,506,595 A | 4/1996 | Fukano et al. | 345/7 |
| 5,506,728 A | 4/1996 | Edwards et al. | 359/629 |
| 5,526,191 A | 6/1996 | Nishii et al. | 359/757 |
| 5,530,586 A | 6/1996 | Yasugaki | 359/364 |
| 5,537,260 A | 7/1996 | Williamson | 359/727 |
| 5,539,422 A | 7/1996 | Heacock et al. | 345/8 |
| 5,539,554 A | 7/1996 | Lebby et al. | 359/83 |
| 5,539,578 A | 7/1996 | Togino et al. | 359/630 |
| 5,543,958 A | 8/1996 | Lebby et al. | 359/254 |
| 5,546,227 A | 8/1996 | Yasugaki et al. | 359/630 |
| 5,552,934 A | 9/1996 | Prince | 359/629 |
| 5,552,943 A | 9/1996 | Hirano et al. | 360/69 |
| 5,557,353 A | 9/1996 | Stahl | 353/69 |
| 5,579,161 A | 11/1996 | Sekiguchi | 359/559 |
| 5,587,836 A | 12/1996 | Takahashi et al. | 359/630 |
| 5,596,433 A | 1/1997 | Konuma | 359/631 |
| 5,596,451 A | 1/1997 | Handschy et al. | 359/633 |
| 5,612,549 A | 3/1997 | Nelson et al. | 257/88 |
| 5,619,377 A | 4/1997 | Rallison | 359/631 |
| 5,625,372 A | 4/1997 | Hildebrand et al. | 345/8 |
| 5,627,678 A | 5/1997 | Nishii et al. | 359/561 |
| 5,638,218 A | 6/1997 | Oomura | 359/727 |
| 5,644,323 A * | 7/1997 | Hildebrand et al. | 345/8 |
| 5,654,827 A | 8/1997 | Reichert | 359/631 |
| 5,657,165 A | 8/1997 | Karpman et al. | 359/634 |
| 5,659,430 A | 8/1997 | Togino | 359/731 |
| 5,661,604 A | 8/1997 | Kuba | 359/637 |
| 5,671,994 A | 9/1997 | Tai et al. | 362/31 |
| 5,684,497 A | 11/1997 | Hildebrand et al. | 345/8 |
| 5,696,521 A | 12/1997 | Robinson et al. | 345/8 |
| 5,771,124 A | 6/1998 | Kintz et al. | 359/633 |
| 5,886,822 A | 3/1999 | Spitzer | 359/630 |
| 5,892,624 A | 4/1999 | Kintz et al. | 359/637 |
| 5,905,478 A | 5/1999 | Hildebrand et al. | 345/8 |
| 5,926,318 A * | 7/1999 | Herbert | 359/618 |
| 6,005,720 A | 12/1999 | Watters et al. | 359/633 |
| 6,040,946 A * | 3/2000 | Herbert | 359/630 |
| 6,111,701 A | 8/2000 | Brown | 359/634 |
| 6,222,677 B1 | 4/2001 | Budd et al. | 359/630 |

OTHER PUBLICATIONS

Pedrotti, F. L., "Introduction to Optics", Prentice Hall, pp. 522 and 528–530 (1993).

Pedrotti, F. L., "Introduction to Optics", Prentice Hall, Chapt. 5, "Aberration Theory" (1993).

B. E. A. Saleh and M. C. Teich, "Fundamentals of Photonics", John Wiley and Sons, pp. 135–139 (1991).

* cited by examiner

US 6,433,935 B2

DISPLAY ILLUMINATION SYSTEM

RELATIONSHIP TO COPENDING APPLICATIONS

This application is a continuation in part of Application Ser. No. 09/372,651, filed Aug. 11, 1999, now U.S. Pat. No. 6,055,110 which is a continuation of Application Ser. No. 09/237,996, filed Jan. 26, 1999, now U.S. Pat. No. 5,959,781 which is a continuation of Application Ser. No. 09/033,208, filed Mar. 2, 1998, now U.S. Pat. No. 5,892,624 which is a continuation of Application Ser. No. 08/673,894, filed Jul. 2, 1996, now U.S. Pat. No. 5,771,124.

BACKGROUND OF THE INVENTION

1. Field of the Invention

The invention generally relates to compact electronic display systems. More specifically, the invention relates to illumination systems for use with compact electronic display systems.

2. Description of Related Art

A continuing objective in the field of electronics is the miniaturization of electronic devices. Most electronic devices include some form of display system which provides information to the user. As electronic devices are miniaturized, display systems are needed which can be incorporated into increasingly smaller devices. It is thus important that the space required to house these display systems be reduced. In one regard, it is desirable that the thickness of the display system be reduced, the thickness of the display referring to the dimension of the display system which is perpendicular to the plane of the image formed by the display.

In general, the image provided by an electronic display may be either a real image or a virtual image. One approach to reducing the size of a display system is through the formation of a virtual image instead of a real image. A variety of virtual image displays have been described including those described in U.S. Pat. Nos. 5,644,323; 5,625,372; 5,684,497; 5,771,124; 5,838,498; 5,870,068; 5,892,624; 5,905,478, each of which are incorporated herein by reference.

A real image refers to an image which is observed directly by the unaided human eye. A real image exists at a given location when a real image can be observed by the unaided eye if a viewing surface is positioned at the location. A photograph is an example of a real image. Examples of electronic displays which provide real images include liquid crystal displays, CRT monitors. and projection screens.

Compact electronic devices, because of their small size, have a limited surface area on which to provide a real image. Since the amount of detail that the human eye can resolve per unit area is limited, devices which provide a real image are only able to provide a limited amount of legible information per display screen.

By contrast to real image displays, virtual image displays provide a virtual image, i.e., an image which, if a viewing surface were positioned at the location of the virtual image, no image would be observed by the eye. By definition, a virtual image can exist at a location where no display surface exists. An example of a virtual image is the image of fine print viewed through a magnifying glass.

In the case of a virtual display, the image is first formed by an imaging component referred to as the source object. As with real image displays, the source object may be a CRT or a liquid crystal display, but it is usually miniaturized to reduce the overall size of the display system. Magnifying optics are then utilized to form the virtual image that is actually seen by the viewer. Source objects may actually generate the light that is viewed as in the case of a CRT or luminescent device. Such a display is said to be an emissive display. Alternatively, the display may be non-emissive such as a liquid crystal display which requires illumination from an external source of light.

Virtual image displays provide an image which appears to be larger than the source object. As a result, the size of the virtual image, as perceived by the user, is limited by the magnification of the display system as opposed to the size of the electronic display. This enables virtual image displays to provide the user with a greater amount of legible information per display screen than real image displays in the same space. It also enables a virtual image display to be designed which provides the same amount of information per screen as real image displays in a smaller space.

An important aspect of the functioning of a virtual image display is the ease of viewing the virtual image. In this regard, it is important for the display to provide a wide apparent angular width of the virtual image, commonly referred to as the field of view of the virtual image. The full field of view is defined as the ratio of the largest apparent dimension of the virtual image to the apparent distance to the virtual image. It is generally equivalent to the field of view for a real image display surface. A need exists for a virtual image display system which provides a wide field of view.

A wide field of view requires a large aperture through which the image is viewed in order to have a comfortable distance between the display and the eye, which is referred to as the eye relief of the display. Another important property of a virtual display is a large amount of space within which the eye can move and still see the image. This space is referred to as the eye-box.

If the source object of the display is non-emissive, the display must be illuminated by a source of light such as a lamp or LED. When the microdisplay is a non-emissive, reflective display, the illumination must be provided from the front side of the display, which is made more difficult by the need to view the image created on the front side of the display. It is important that this illumination provide ample light such that the resulting image is bright and that the image has sufficient contrast between bright and dark portions of the image. In the case of a transmissive liquid crystal display, the illumination is provided from the rear side of the display and is referred to as backlighting.

Since virtual image displays are frequently used in portable devices, it is important for the displays to be energy efficient. Hence, it is desirable for the displays to use a low amount of energy for illumination. A need therefore exists for a display system which provides a bright virtual image. A further difficulty associated with virtual image displays is irregularities in the illumination of the source object. A need therefore also exists for a display system which provides a virtual image having substantially uniform illumination across the image.

SUMMARY OF THE INVENTION

The present invention relates to illumination systems for use in virtual image display systems. In general, the virtual image display systems of the present invention include a non-emissive, reflective microdisplay which forms a source object; an optical system which forms a magnified, virtual image of the source object from light reflected off the microdisplay; a light source system which produces light to illuminate the microdisplay; and illumination system according to the present invention.

In one embodiment, the illumination system forms at least two virtual light sources to illuminate the microdisplay. In one variation, the at least two virtual light sources include a first virtual light source positioned approximately in front of and directly over the microdisplay and second virtual light source positioned over and to one side of the microdisplay. The illumination system may also form three or more virtual light sources to illuminate the display system. In one variation, the at least three virtual light sources include a first virtual light source positioned approximately in front of and directly over the microdisplay, a second virtual light source positioned over and to a first side of the microdisplay, and a third virtual light source positioned over and to a second side of the microdisplay.

In another embodiment, the illumination system directs light from the light source system through the illumination system to the microdisplay such that the angles of incidence of light which illuminates the microdisplay varies across the microdisplay over an angular range that is greater than would be provided by the light source system if the light source system were to directly illuminate the microdisplay.

In another embodiment, the illumination system directs light from the light source system through the illumination system to the microdisplay such that the angles of incidence of light which illuminates the microdisplay varies across the microdisplay over an angular range of at least 40 degrees. In one variation, the angles of incidence of light which illuminates the microdisplay vary over an angular range of at least 60 degrees. In another variation, the angles of incidence of light which illuminates the microdisplay vary over an angular range of between about 40 degrees and 120 degrees, more preferably between about 60 degrees and 100 degrees.

In another embodiment, the illumination system directs light from the light source system through the illumination system to the microdisplay such that a first portion of the light incident on the microdisplay is approximately perpendicular to the microdisplay, a second portion of the light incident on the microdisplay is positively angularly displaced relative to the perpendicular to the microdisplay, and a third portion of the light incident on the microdisplay is negatively angularly displaced relative to the perpendicular to the microdisplay.

In another embodiment, the illumination system includes an illumination body which transmits light from the light source system to the microdisplay to illuminate the microdisplay where a first potion of the light is internally reflected off one surface of the illumination body prior to illuminating the display system and a second portion of the light is internally reflected off two surfaces of the illumination body prior to illuminating the display system. According to this embodiment, at least one of the internal reflections may be a total internal reflection. According to this embodiment, multiple and optionally all of the internal reflections may be total internal reflections. Also according to this embodiment, the first portion of light from the light source may traverse the illumination body by being internally reflected off of a surface of the illumination body adjacent the optical system prior to reaching the microdisplay. Also according to this embodiment, the second portion of light from the light source may traverse the illumination body by being internally reflected off of a surface of the illumination body adjacent the microdisplay, then internally reflected off of a surface of the illumination body adjacent the optical system prior to reaching the microdisplay. Also according to this embodiment, a third portion of the light may be internally reflected off the surfaces of the illumination body three times prior to illuminating the display system.

In another embodiment, the illumination system includes an illumination body which transmits light from the light source system to the microdisplay to illuminate the microdisplay, the light source system being positioned adjacent a first surface of the illumination body, the microdisplay being positioned adjacent a second surface of the illumination body, and the optical system being positioned adjacent a third surface of the illumination body, where a portion of the light from the light source traverses the illumination body by being internally reflected off the third surface of the illumination body. According to this embodiment, at least one of the internal reflections may be a total internal reflection. Optionally all of the internal reflections may be total internal reflections.

Also according to this embodiment, a portion of the light from the light source may traverses the illumination body by being internally reflected off the second surface of the illumination body and then internally reflected off the third surface of the illumination body. Also according to this embodiment, a first portion of the light from the light source traverses the illumination body by being internally reflected off the third surface of the illumination body, and a second portion of the light from the light source traverses the illumination body by being internally reflected off the second surface of the illumination body and then internally reflected off the third surface of the illumination body. Also according to this embodiment, a first portion of the light from the light source traverses the illumination body by being internally reflected off the third surface of the illumination body, a second portion of the light from the light source traverses the illumination body by being internally reflected off the second surface of the illumination body and then internally reflected off the third surface of the illumination body, and a third portion of the light from the light source traverses the illumination body by being internally reflected off the third surface of the illumination body, then internally reflected off the second surface of the illumination body, and then internally reflected off the third surface of the illumination body.

In regard to any of the above embodiments, the illumination system may comprise an illumination body which forms the at least two virtual light sources. The illumination body may include a prism which functions to form the at least two virtual light sources. The light source system may be positioned adjacent a first surface of the prism, the microdisplay being positioned adjacent a second surface of the prism, and the optical system being positioned adjacent a third surface of the prism. The light source system produces polarized light and the third prism surface is attached to a reflective polarizer. In one variation, the angle between the third prism surface and the second prism surface is less than 45 degrees, more preferably between 20 and 35 degrees. In a further variation, the angle between the first prism surface and the second prism surface is between about 1.7 and 2.3 times the size of the angle between the third prism surface and the second prism surface.

The present invention also relates to light source systems for use in virtual image display systems. In general, the virtual image display systems include a non-emissive, reflective microdisplay which forms a source object; an optical system which forms a magnified, virtual image of the source object from light reflected off the microdisplay; a light source system according to the present invention which produces light to illuminate the display system; and an illumination system which directs light from the light source system to the microdisplay. It is noted that the illumination system may be an illumination system as taught herein or may be a different illumination system.

An embodiment of a light source system according to the present invention comprises a light source body which includes a light entry surface across which light from a light source element enters the light source system, a light exit surface across which light is transmitted from the light source system to the illumination system, and a first diffusing/reflective region positioned opposite the light exit surface which includes an internally reflective surface and a diffusing region internal to the internally reflective surface, the diffusing region diffusing light which traverses the diffusing region.

According to this embodiment, all of the surfaces of the light source body other than the light entry surface and the light exit surface are preferably internally reflective and more preferably highly diffusely reflective.

In one variation, the light entry surface is orthogonal to the light exit surface. In this regard, light which enters through the light entry surface is first internally reflected before reaching and exiting the light exit surface. In this regard, the internally reflective surface of the first diffusing/reflective region and the light exit surface are preferably angled relative to each other so as to direct light to the light exit surface. The angle between the internally reflective surface of the first diffusing/reflective region and the light exit surface is preferably between about 10 degrees and 45 degrees, more preferably between about 10 degrees and 25 degrees, most preferably between about 11 degrees and 13 degrees. The internally reflective surface of the first diffusing/reflective region preferably has a length of at least 10 mm, more preferably between 10–14-mm. The light exit surface preferably has a length of at least 10-mm, more preferably between 10–12-mm.

According to any of the above variations, the light source system may further include one or more optical layers positioned between external to the light exit surface, the one or more optical layers performing one or more functions selected from the group consisting of columniation and polarization. In one variation, the one or more optical layers includes a plurality of optical layers where an air gap is positioned between adjacent optical layers.

The optical layers may include a first and a second collimators positioned external to the light exit surface. An air gap is preferably positioned between the first and second collimators. The first and second collimators are preferably at right angles relative to each other. A polarizer may also be positioned external to the light exit surface adjacent the collimators.

BRIEF DESCRIPTION OF THE FIGURES

FIG. 2A provides a sideview of an illumination system.

FIG. 2B illustrates paths of light rays traveling within the illumination system.

FIG. 3A provides a perspective view of a light source system.

FIG. 3B provides a side view of the light source system illustrated in FIG. 3A.

FIG. 4A illustrates an optical system employing an immersed beam splitting element.

FIG. 4B illustrates an alternative embodiment of an optical system employing an immersed beam splitting element where total internal reflection off of a rear surface of the immersed beam splitting element is employed.

FIG. 4C illustrates an alternate embodiment where a polarization modifier is positioned between the beam splitter and the reflective first optical element.

FIG. 7A illustrates an optical system having a first magnification optic, a second magnification optic and an image synthesizing optic where the first and second magnification optics are aligned with each other.

FIG. 7B illustrates the optical system having a first magnification optic, a second magnification optic and an image synthesizing optic where the first and second magnification optics are not aligned with each other.

DESCRIPTION OF THE PREFERRED EMBODIMENTS

Figure 1:
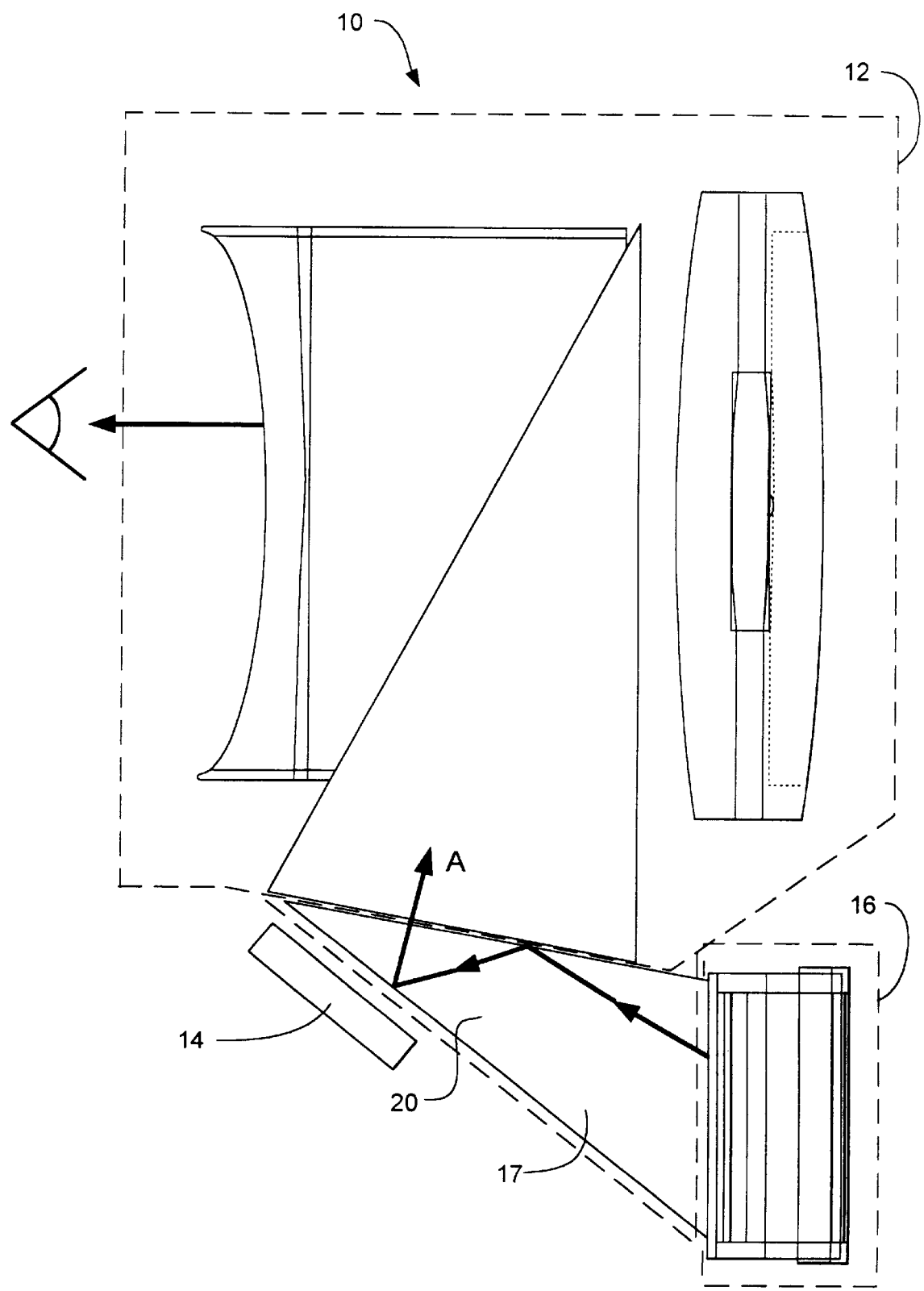
FIG. 1 illustrates a side view of a display according to the present invention.

Illumination systems are provided which may be used in various compact virtual image display systems. The illumination systems of the present invention provide enhanced illumination which, in turn, enable the display systems to provide a virtual image with a large eye-box, a large field of view, and a very compact overall display system design.

A feature of the present invention is the ability of the illumination systems to direct light from a light source system used in the display system to the microdisplay such that the angles of incidence of light which illuminates the microdisplay varies across the microdisplay over an angular range that is greater than would be provided by the light source system if the light source system were to directly illuminate the microdisplay. This serves to enlarge the effective size of the light source while maintaining the compact size of the overall display.

The illumination systems of the present invention are designed to be used in compact display systems where it is desirable to minimize the size of the display system. As a result, the size of the light source that may be used is limited. By enlarging the effective size of the light source without having to enlarge the light source itself, a compact size for the display system is achieved.

The illumination systems' ability to direct light from a light source system to the microdisplay such that light is incident on the microdisplay over a range of angles of incidence is accomplished by the illumination systems effectively creating multiple virtual light sources where one virtual light source is positioned approximately in front of and directly over the microdisplay, one is positioned over and to one side of the microdisplay, and another is positioned over and to another side of the microdisplay. As a result, light is caused to be directed onto the microdisplay where. light rays incident on the microdisplay are (a) approximately perpendicular to the microdisplay (b) positively angularly displaced relative to the perpendicular to the microdisplay, and (c) negatively angularly displaced relative to the perpendicular to the microdisplay.

Light source systems are also provided which may be used in various compact virtual image display systems. The light source systems of the present invention are compact in size and hence well suited for use with compact display systems employing microdisplays. The light source systems also provide a high level of light efficiency, thus providing better illumination for the display system. The light source systems also provide better uniformity of illumination across the virtual image provided by the display system. The light source systems are readily adapted for use with monochromatic, polychromatic or white light illumination.

The illumination systems and light source systems of the present invention may be used in a wide variety of the display systems. These display systems may be employed as an inexpensive component which may be incorporated into any electronic device in which a display is used. In one embodiment, the display system is designed for use in pocket-sized electronic devices. Examples of such devices include, but are not limited to, portable computers, personal communicators, personal digital assistants, modems, pagers, video and camera viewfinders, portable GPS systems, mobile phones, television monitors and other hand held devices.

FIG. 1 illustrates an embodiment of a display system 10 in which an illumination system and light source system according to the present invention may be employed. The display system 10 includes an optical system 12, a microdisplay 14, a light source system 16, and an illumination system 17. The microdisplay 14 includes an imaging surface 18 where a source object is formed. As indicated by the arrow labeled A, light from the light source system 16 is directed through the illumination system 17 such that the light is incident on the imaging surface 18. Light from the light source system 16 passing to the imaging surface 18 can experience one or more reflections off the surfaces of the illumination system 17. Light incident on the imaging surface 18 is reflected and passes through the illumination system 17 to the optical system 12 where the source object is magnified and viewed by a user as a virtual image.

As illustrated in FIGS. 1 and 4A–7B, the optical system 12, the microdisplay 14, the light source system 16 and illumination system 17 can be arranged in a variety of different configurations relative to each other. It is noted that all potential configurations of these components are intended to be encompassed within the scope of the present invention. Further, it is noted that numerous different types of optical systems 12 and microdisplays 14 can be used in the present invention, some embodiments of which are disclosed herein. It is noted that all embodiments of optical systems and microdisplays, including those not disclosed herein, which may be adapted to be used with the illumination systems and/or the light source systems of the present invention are intended to be encompassed within the scope of the present invention.

A. ILLUMINATION SYSTEM

Figure 2A:
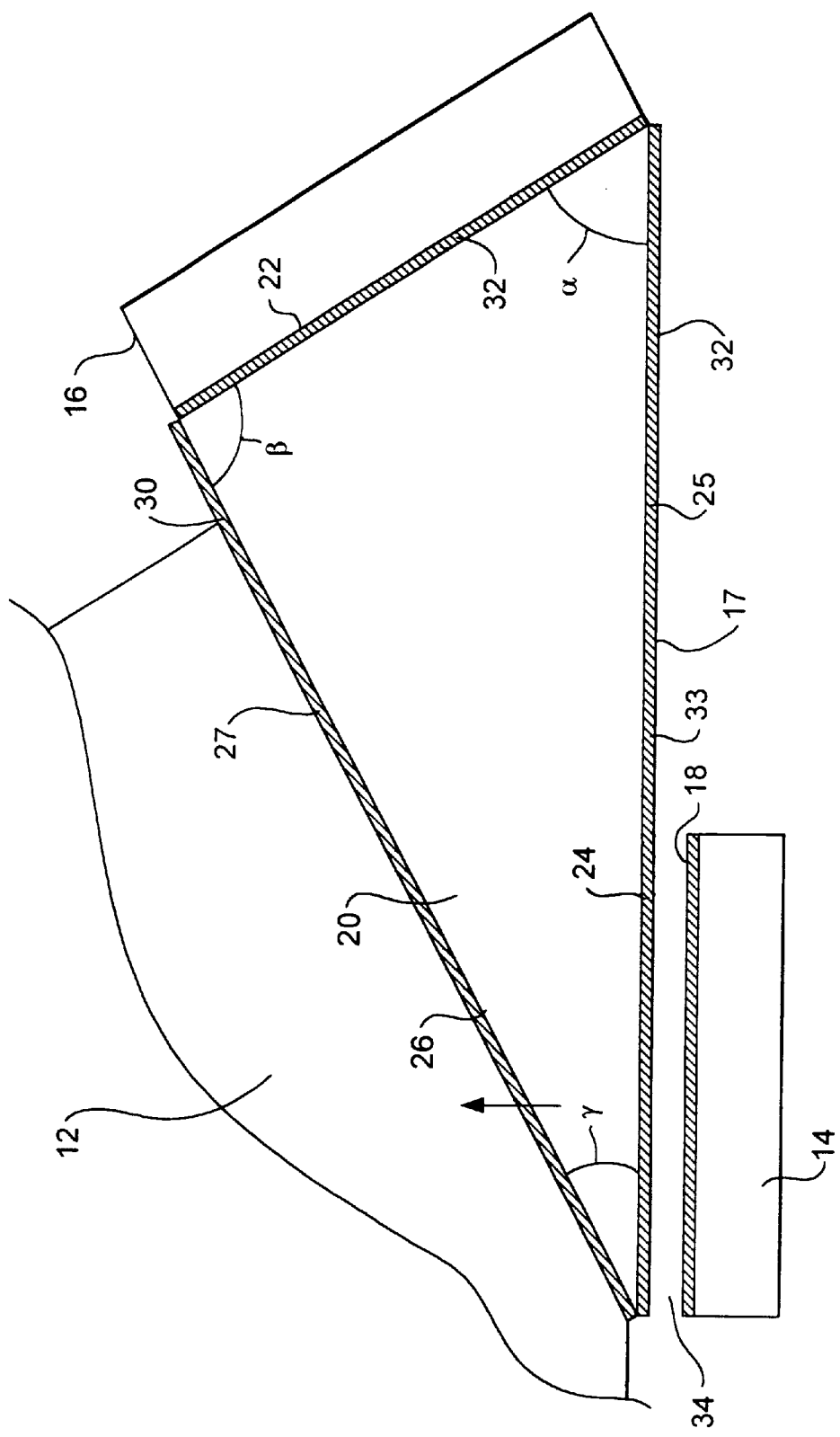
FIGS. 2A–2B illustrate an illumination system according to the present invention.

FIG. 2A illustrates an illumination system 17 according to the present invention. The illumination system 17 includes an illumination body 20. The illumination body 20 has a light-entry surface 22 across which illumination from a light source system 16 enters the illumination body 20. The illumination body 20 also has a display-facing surface 24, which can either internally reflect the illumination back into the illumination body 20 or transmit the illumination light to the microdisplay 14 positioned adjacent the display-facing surface 24. Illumination light is reflected off the microdisplay 14 and reenters the illumination body 20 through the display-facing surface 24. The illumination body 20 also has a magnifier-facing surface 26 which can either internally reflect illumination light back into the illumination body 20 or transmit light which has been reflected off the microdisplay 14, thereby exiting the illumination system 17 and entering the optical system 12.

As will be described herein, different portions of illumination from the light source system reach the microdisplay 14 after traversing different paths through the illumination body 20. One portion reaches the microdisplay 14 after being reflected off of only the magnifier-facing surface 26 of the illumination body 20. Other portions of the illumination light reach the microdisplay 14 after being reflected off of multiple surfaces of the illumination body 20 (including both the magnifier-facing surface 26 and then the display-facing surface 24). These different portions of the illumination from the light source system form different virtual light sources which combine to provide the display with a larger eye-box than would otherwise be provided by a single light source transmitting light directly to the microdisplay. It is noted that additional portions of illumination from the light source system may reach the microdisplay 14 involving three or more internal reflections, these portions forming additional virtual light sources.

Figure 2B:
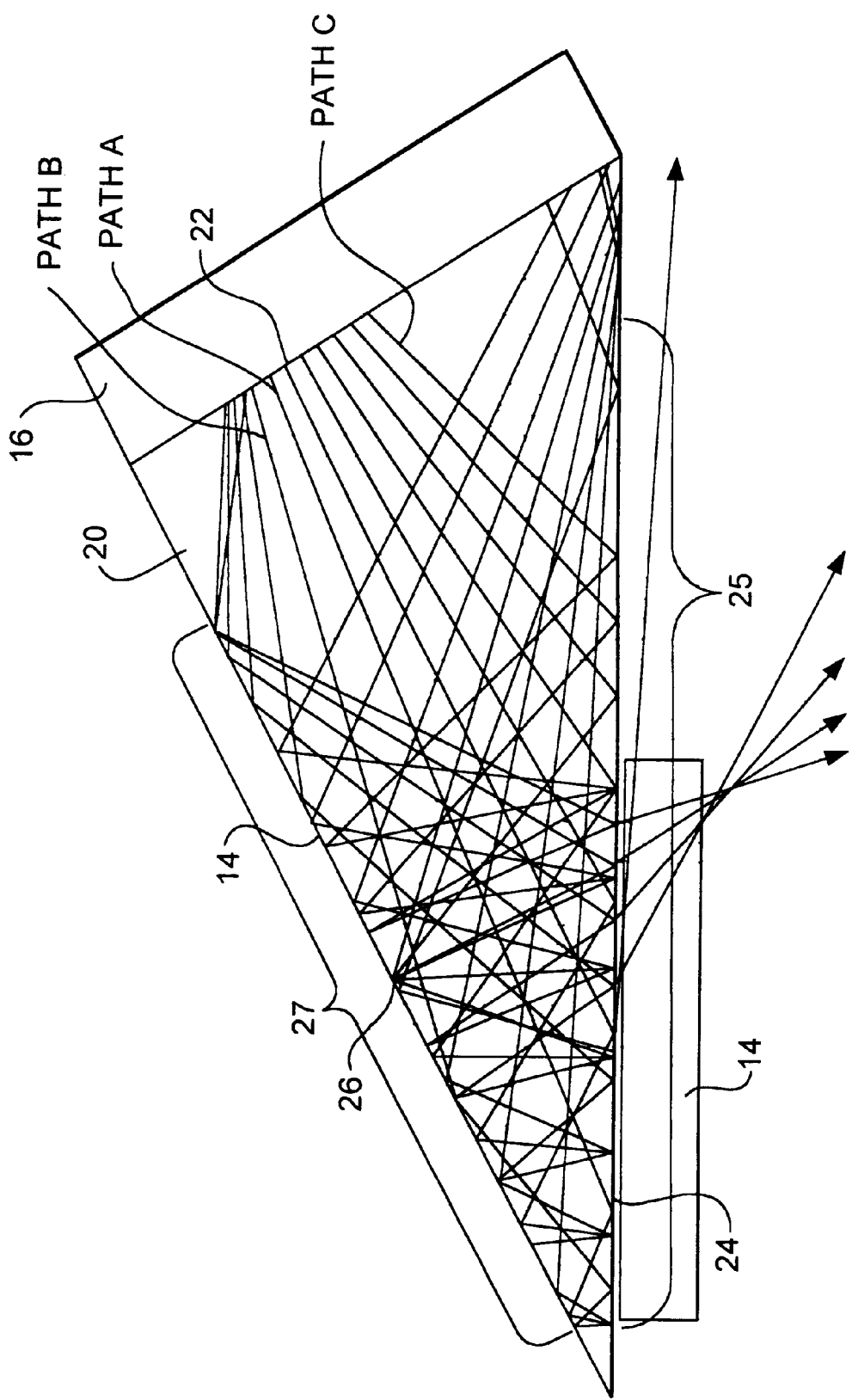

FIG. 2B illustrates several potential paths for light traveling through the illumination body 20 from the light source system 16 to the microdisplay 14. As illustrated, a first path for the light (Path A) reaches the imaging surface 18 of the microdisplay 14 after being internally reflected off of the magnifier-facing 26 surface of the illumination body 20. As will be described herein, the portion of light following this first once-reflected path corresponds to a first virtual light source (illustrated in FIG. 2C as element 40). A second path for the light (Path B) is internally reflected first off the display-facing surface 24 and then internally reflected off the magnifier-facing surface 26 prior to reaching the microdisplay 14. As will be described herein, the portion of light which follows this second, two-reflection path corresponds to a second virtual light source (illustrated in FIG. 2C as element 36). A third path for the light (Path C) involves the light being internally reflected off magnifier-facing surface 26 and then internally reflected off the display-facing surface 24 and then internally reflected again from the magnifier facing surface 26 prior to reaching the microdisplay 14. As will be described herein, the portion of light which follows this third, three-reflection path corresponds to a third virtual light source (illustrated in FIG. 2C as element 38).

As illustrated in FIG. 2B, the illumination system is designed such that a first portion of the light (Path A) is internally reflected off one surface of the illumination body prior to illuminating the display system and a second portion of the light (Path B) is internally reflected off two surfaces of the illumination body prior to illuminating the display system. Yet a third portion of the light (Path C) is internally reflected off three surfaces of the illumination body prior to illuminating the display system. One or more of the internal reflections may be a total internal reflection. Alternatively, coatings may be used to cause the internal reflections.

As noted in regard to FIG. 2B, light may reach the microdisplay 14 from the light source system 16 after one, two, three, or more reflections within the illumination system. As a result of different portions of the light reaching the microdisplay after different numbers of reflections, the angles of incidence of light which reaches the microdisplay varies over an angular range that is greater than would be provided by the light source system if the light source system were to directly illuminate the microdisplay. This serves to increase the size of the eye-box that is produced. For example, if the light source system were to directly illuminate the microdisplay, all of the light would be incident at approximately the same angle. By contrast, by creating the multiple virtual light sources, the angular range of the angles of incidence for light from the different paths reaching the microdisplay is significantly increased.

In one embodiment, the illumination system is designed to direct light from the light source system through the illumination system to the microdisplay such that the angles of incidence of light which illuminate the microdisplay varies across the microdisplay over an angular range of at least 40 degrees. The angular range may optionally be at least 60 degrees. Optionally, the angular range may be between about 40 degrees and 120 degrees more preferably between about 60 degrees and 100 degrees.

Figure 2C:
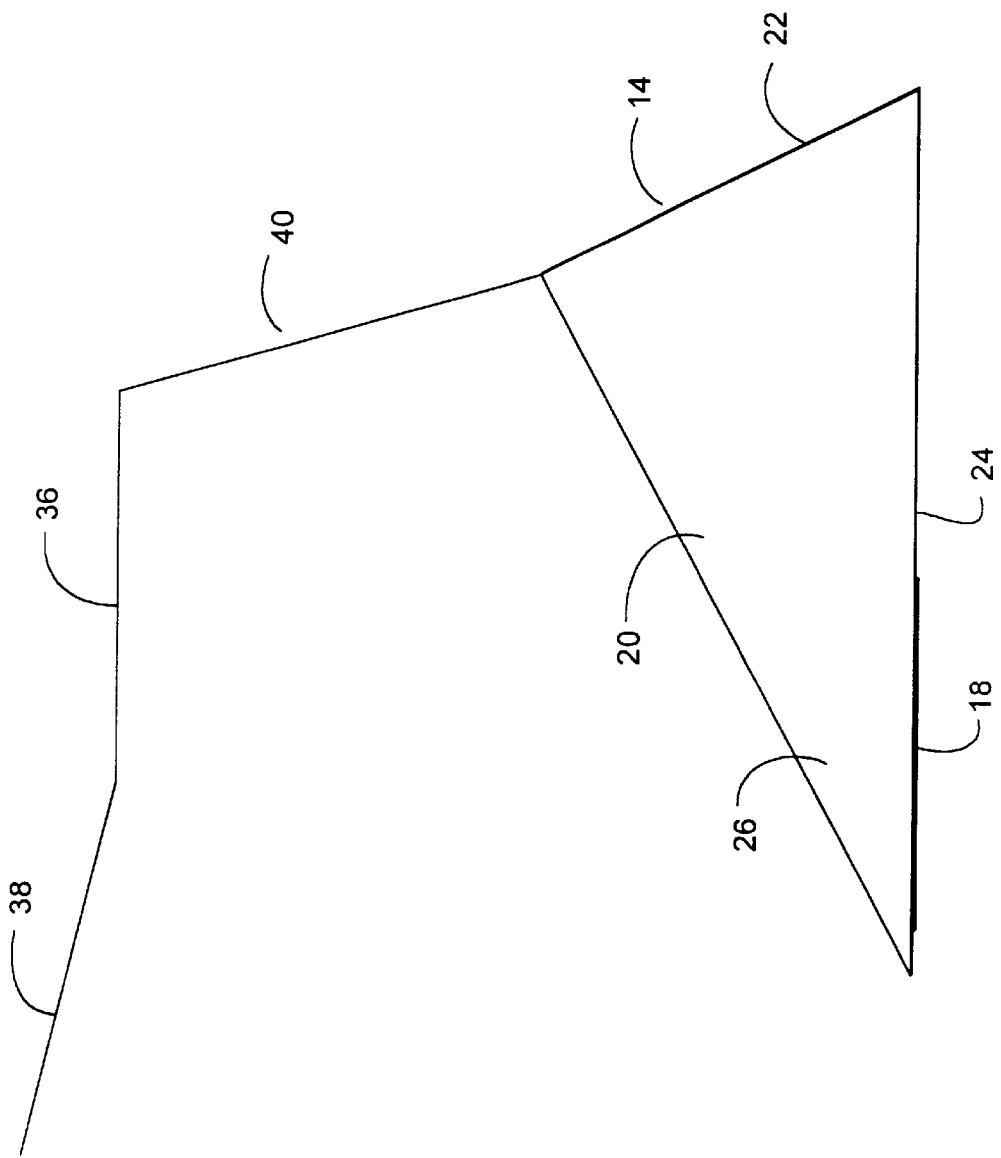
FIG. 2C illustrates virtual light sources formed by the illumination system illustrated in FIGS. 2A and 2B.
Figure 2D:
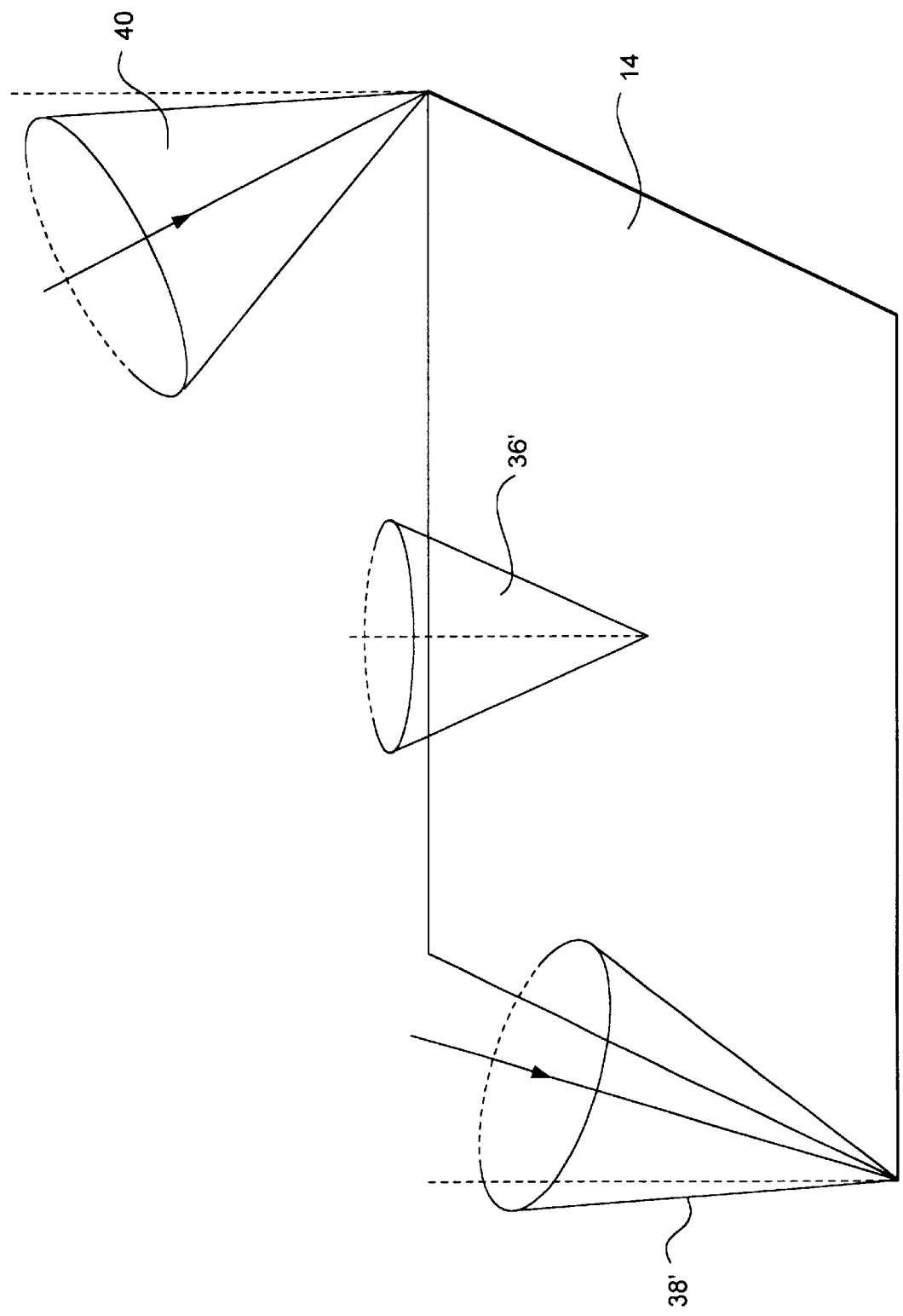
FIG. 2D illustrates cones of light from the virtual light sources contacting the microdisplay.

FIG. 2C illustrates the virtual light sources provided by the combination of light source system 16 and the illumination system 17 shown in FIGS. 2A and 2B. FIG. 2D illustrates cones of light 36', 38' and 40' from the virtual light sources 36, 38 and 40 respectively contacting the microdisplay.

Applicants refer to 36, 38 and 40 of FIG. 2C as "virtual light sources" because they correspond to locations where a real light source would need to be positioned in order to accomplish the same result as illumination system 17 but without any reflections.

Virtual light source 36 corresponds to light which reaches the microdisplay 14 after two reflections (e.g., Path B). The virtual light source corresponding to this portion of the illumination is positioned in front of and approximately over the microdisplay. Light rays that would be incident on the microdisplay 14 would be approximately perpendicular to the microdisplay 14. As illustrated in FIG. 2D, cone of light 36' is approximately centered around a perpendicular to the microdisplay 14.

Virtual light source 40 corresponds to light which reaches the microdisplay 14 with a single reflection off magnifier-facing surface 26 (e.g., Path A). The virtual light source corresponding to this portion of the illumination is positioned over and to one side (right) of the microdisplay 14. Light rays that would be incident on the microdisplay from this virtual light source would positively angularly displaced (positive angles being to the right of perpendicular) relative to the perpendicular to the microdisplay. As illustrated in FIG. 2D, cone of light 40' is approximately centered right of the perpendicular to the microdisplay 14.

Virtual light source 38 corresponds to light which reaches the microdisplay 14 with a reflection off display-facing surface 24 and two reflections off magnifier-facing surface 26 (e.g., Path C). The virtual light source corresponding to this portion of the illumination is positioned over and to one side (left) of the microdisplay 14. Light rays that would be incident on the microdisplay from this virtual light source would negatively angularly displaced (negative angles being to the left of perpendicular) relative to the perpendicular to the microdisplay. As illustrated in FIG. 2D, cone of light 38' is approximately centered left to the perpendicular to the microdisplay 14.

Additional virtual light sources beyond 36, 38 and 40 may also be created but the illumination system but are not illustrated for purposes of clarity. Illumination systems which produce these additional virtual light sources are nonetheless intended to be within the scope of the present invention.

An important feature of the present invention is that the illumination system 17 creates these multiple virtual light sources from single light source system 16. As can be seen from FIGS. 1, and 4A–7B, there is no room in the display systems to position light sources where the virtual light sources 36, 38 and 40 are positioned. Rather, the virtual light sources are positioned where the optical systems are in these display systems (or at least where light from the light sources would have to traverse the optical systems). One therefore would need to significantly increase the size of the display systems to accommodate the addition of these multiple light sources. One would also have to design the display systems such that illumination can be transmitted through the optical system to the microdisplay 14. Instead, by using the illumination system of the present invention, Applicants avoid these problems and meanwhile provide enhanced illumination.

A further important feature of the present invention is that the illumination system 17 creates multiple virtual light sources as opposed to a single light source. Virtual light source 36 primarily provides illumination to an optical view which is perpendicular to the microdisplay. Meanwhile, virtual light source 38 provides illumination to an optical view which is right of the perpendicular to the microdisplay and virtual light source 40 provides illumination to an optical view which is left of the perpendicular to the microdisplay. Since illumination is provided to a field of view both left and right of the perpendicular to the microdisplay, a larger eye-box is provided to the user. This enhances the ergonomics of the display system and creates a much larger eye-box for the viewer's ease of use.

It is noted that the optical system may have a folded optical path, such as the path illustrated in FIG. 1. In such instances, it is preferred that the illumination system be designed such that the multiple virtual light sources are aligned with the optical plane. The eye-box produced by the optical system is constrained in the plane of the folded optical path. By aligning the multiple virtual light sources in the optical plane of the folded optical path, the size of the eye-box along that dimension is increased.

The illumination body 20 may be made of a variety of different materials. Examples of suitable materials include, but are not limited to. glass, acrylic plastic, and polycarbonate.

The illumination body 20 used in the illumination system can have a variety of shapes in order to create the above described virtual light sources. In one embodiment, the illumination body 20 is a triangle shaped block. When the illumination body 20 is a triangular in shape, the illumination entry surface 22 is preferably at least 4 mm in length and preferably between about 4–10 mm in length. The display-facing surface 24 is preferably at least 6 mm in length and preferably between about 6–18 mm in length. The magnifier-facing surface 26 is preferably at least 6 mm in length and preferably between about 6–18 mm in length.

As illustrated in FIG. 2A, the illumination entry surface 22 is positioned at an angle $\alpha$ relative to the display-facing surface 24 and at an angle $\beta$ relative to the magnifier-facing surface 26. Meanwhile, the display surface 24 is positioned at an angle γ relative to the magnifier-facing surface 26. The angle between the magnifierfacing surface 26 and the display-facing surface 24 is preferably less than 45 degrees, more preferably between about 20 and 35 degrees. The angle between the entry surface 22 and the display-facing surface 24 is preferably between about 1.7 and 2.3 times the size of the angle between the display surface 24 and the magnifier-facing surface 26.

Referring to FIG. 2A, a polarizing beam splitter 30 may optionally be positioned adjacent to the magnifier-facing surface 26, more preferably between the magnifier-facing surface 26 and the optical system 12. The polarizing beam splitter 30 may be incorporated into the illumination body 20, for example, as a coating on the magnifier-facing surface 26. Alternatively, an independent optical element comprising the polarizing beam splitter 30 may be positioned between the magnifier-facing surface 26 and the optical system 12. The polarizing beam splitter 30 preferably has a large acceptance angle, preferably 20°–70°, more preferably 10°–80° and most preferably 0°–90°. Examples of materials which may be used to form the polarizing beam splitter 30 include, but are not limited to, DBEF produced by 3M Corporation of St. Paul, Minn.

The illumination entry surface 22 may optionally include an anti-reflective coating 32. Specifically, the illumination entry surface 22 may include an anti-reflective coating 32 between the illumination entry surface 22 and the light source system 16. The anti-reflective coating 32 serves to reduce the amount of light from the light source system 16 which is reflected off the illumination entry surface 22 at the illumination body 20—light source system 16 interface. By using an anti-reflective coating, more light enters the illumination system, which in turn, increases the resulting brightness of the display system.

The display surface 24 may optionally include an anti-reflective coating 33. Specifically, the display-facing surface 24 may include an anti-reflective coating 33 between the display-facing surface 24 and the microdisplay 14. The anti-reflective coating 33 serves to reduce the amount of light reflected at the microdisplay 14—illumination body 20 interface. As a result, more light enters the illumination system from the microdisplay, which in turn, increases the resulting brightness of the display system. It is noted that the imaging surface 18 of the microdisplay 14 may also optionally include an anti-reflective surface 35.

The portion of the display-facing surface 24 which is not opposite the microdisplay 14, and the portion of the magnifier-facing surface 26 through which light is not transmitted into the field of view may each optionally be coated to cause light to be internally reflected even at angles less than the critical angle. By preventing such light from exiting the illumination body 20 that is intended to be directed to the microdisplay by one or more internal reflections, the amount of light ultimately delivered into the field of view is increased, thereby increasing the overall brightness of the image that is provided to the viewer.

An air gap 34 is formed at the microdisplay 14—illumination body 20 interface. The air gap 34 allows light at angles greater than the critical angle to be totally internally reflected as is required for portions of the illumination typical of portions of Paths B and C, which internally reflect from the display-facing surface 26.

B. LIGHT SOURCE SYSTEM

The present invention also relates to light source systems which may be used in display systems employing a microdisplay such as the ones described herein. The light source systems of the present invention are compact in size and hence well suited for use with compact display systems employing microdisplays. The light source systems also provide a high level of light efficiency, thus providing better illumination for the display system. The light source systems also provide better uniformity of illumination across the virtual image provided by the display system. The light source systems are readily adapted for use with monochromatic, polychromatic or white light illumination.

Figure 3A:
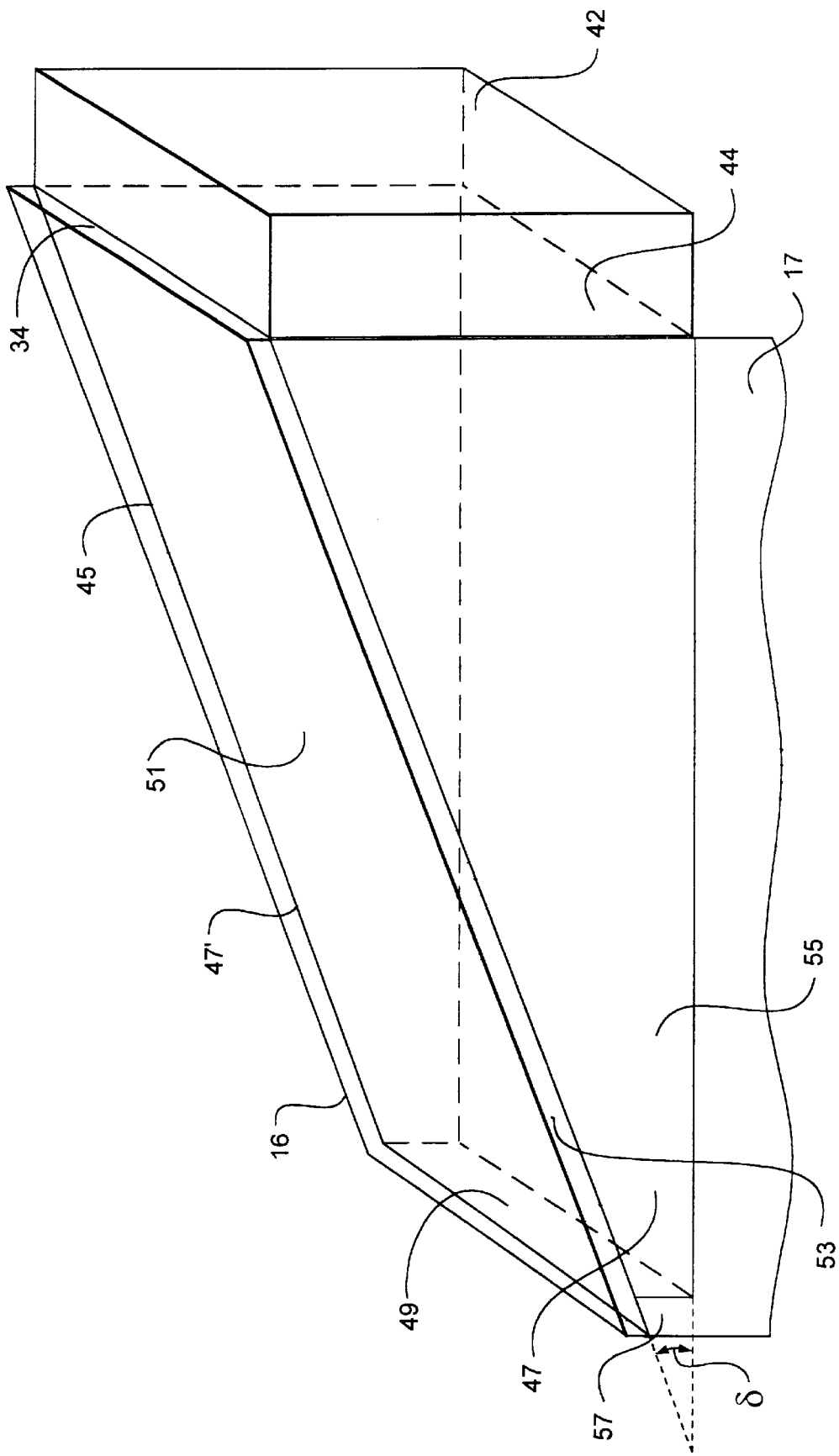
FIGS. 3A–3B illustrate an embodiment of a light source system according to the present invention.
Figure 3B:
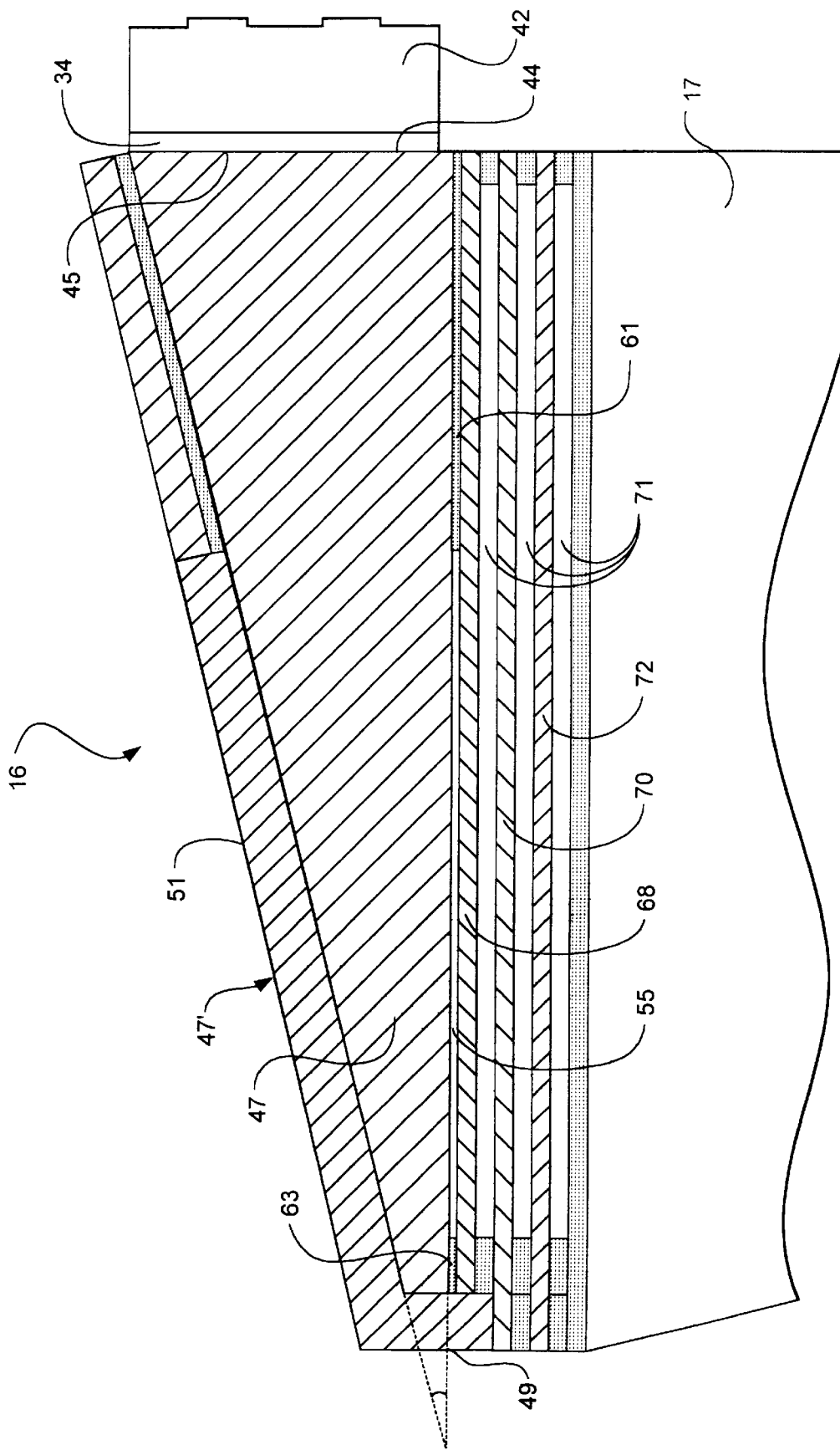

FIGS. 3A and 3B illustrate an embodiment of a light source system 16 according to the present invention. As illustrated in FIG. 3A, the light source system 16 is coupled to and optionally includes a light source element 42 which generates the light provided by the illumination system. Light is delivered from the light source element 42 into the light source system 16 and then from the light source system 16 into the illumination system 17.

In general, the light source element 42 may be any element which produces illumination. The illumination produced by the light source element 42 may be monochromatic, polychromatic or white light. Examples of light source elements include, but are not limited to, incandescent lamps. lasers, and LEDs. When color images are desired, the light source element 42 preferably can produce red, green and blue light. For example, the light source element 42 can include a red LED, a green LED and a blue LED.

The light source system 16 includes a light entry surface 44 across which light from the light source element 42 enters the light source system 16. Light source element 42 is preferably cemented to light entry surface 44 serving to allow as much light as possible to enter the light source system.

The light source system 16 includes side surfaces 47, 47' and an end surface 49 which are designed to prevent light from exiting the light source system 16. This may be accomplished by rendering the side surfaces 47, 47' and end surface 49 internally reflective and preferably highly diffusely reflective.

The light source system 16 further includes a diffusing/reflective region 51 which is internally reflective and diffusive.

The internally reflective surfaces 51 and 47 are designed to prevent light from exiting the light source system 16 and is preferably highly diffusely reflective. The reflective surface preferably has a length of at least 10-mm, more preferably between 10–14-mm. Various coatings are known in the art for rendering these surfaces internally reflective including diffusive reflective paint, or reflective films such as Optilux manufactured by 3M Corp. and DRP Backlight manufactured by W. L. Gore and Assoc.

Diffusely reflecting surfaces 47, 47', 49, and 51 serve to spread light which reach these surfaces over many different angles. As a result, the diffusely reflecting surfaces serve to diffuse light from the light source element 42 so that light which is delivered from the light source system 16 into the illumination system 17 is more evenly distributed. As a result, the virtual image that is produced by the overall display system has better illumination brightness uniformity. Also. multiple light source elements 42 are employed to form a polychromatic image. Since the multiple light source elements 42 cannot all be positioned in the same location, the diffusing surfaces serve to improve illumination uniformity for each color. As a result, the various colors formed using a combination of different light source elements 42 are uniform across the image.

The light source system 16 further includes a light exit surface 55 across which light from the light source system 16 travels to the illumination system 17. Light exit surface 55 preferably has a length of at least 10-mm, more preferably between 10–12-mm.

As illustrated, reflecting surface 51 is positioned at an angle relative to light exit surface 55, giving the light system an overall wedge shape. The angle δ between reflecting surface 51 and the light exit surface 55 is preferably at least 10 degrees and more preferably between 10 to 13 degrees.

FIG. 3B illustrates an embodiment of a light source system 16 in greater detail. As illustrated, the light source system 16 is coupled to light source element 42 which generates the illumination provided by the illumination system. Light is delivered from the light source element 42 into the light source system 16 across light entry surface 44.

The light source system 16 includes side surfaces 47, 47' and end surface 49 which are designed to prevent light from exiting the light source system 16.

The light source system 16 further includes a reflective surface 51 which is designed to prevent light from exiting the light source system 16.

As illustrated, a diffusion region 53 may optionally only extend across a portion of the side of the light source system 16 where the reflective surface 51 is positioned. A reflective surface 59 may be employed adjacent the light elements 42 on side of light source system 16 where the reflective surface 51 is positioned.

The light source system 16 further includes a light exit surface 55 across which light from the light source system 16 travels to the illumination system 17. As illustrated, a portion of the side of the light source system 16 which includes the light exit surface 55 may be rendered internally reflective. For example. as illustrated, the side of the light source system 16 which includes the light exit surface 55 includes internally reflective surface 61 adjacent light element 42 and reflective surface 63 adjacent end surface 49.

Several optical layers may optionally be positioned between the light exit surface 55 and the illumination system 17. These optical layers may perform a variety of different functions including columniation and polarization.

FIG. 3B illustrates one embodiment where a first collimator 68, a second collimator 70 and a polarizer 72 are positioned between the light exit surface 55 of the light source system 16 and the illumination system 17.

Optionally, the second collimator 70 can be positioned at an angle relative to the first collimator 68. In a preferred embodiment, the second collimator 70 is at a right angle to first collimator 68 to provide substantially cone shaped beams exiting the second collimator 70. An example of a collimator that can be used is BEF which is produced by 3M Corporation of St. Paul, Minnesota. BEF films also recycle light which is incident at large angles.

As illustrated, air gaps 71 are preferably positioned between each of the optical layers and between the light exit surface 55 and the nearest optical layer. The air gaps help to reduce light losses due to reflection. The air gaps 71 can be formed by spacers positioned between the various components. Suitable materials for the spacers include, but are not limited to, double sided, pressure sensitive adhesive films.

It is noted that the selection of the optical layers is dependent upon the display system in which the light source system 16 is employed. For instance, when an LCD .-microdisplay is employed. a polarizer is desirable. When the microdisplay employs mirror light valves, collimators are not needed. If is also noted that a two dimensional collimator may be employed when a narrower light source system is desired.

During operation of the light source system 16, light from the light source element 42 passes into the light source system 16. Light which reaches reflective surfaces 59, 61 and 63 are internally reflected. Light which traverses diffusing regions 53 and 57 are diffused and then reflected by reflective surface 51 and end surface 49 When light reaches the light exit surface 55. the light exits the light source system 16. With the assistance of diffusing layers 53 and 57, the intensity of light traversing the light exit surface 55 is uniform across the light exit surface 55. A series of optical layers (e.g., layers 68, 70 and 72) may be used to perform functions on light traversing the light exit surface 55. For example. these layers may perform polarization and columniation functions.

C. MICRODISPLAY

The microdisplay 14 may be any device which includes an imaging surface 18 on which a source object can be formed. Examples of microdisplays include, but are not limited to liquid crystal displays, spatial light modulators, gratings, mirror light valves and LED and FED arrays. More specific examples of microdisplays include, but are not limited to, light reflective liquid crystal displays, cholesteric liquid displays, PSC liquid crystal displays and spatial light modulators.

A preferred microdisplay is a light reflective liquid crystal on silicon display. An example of a light reflective liquid crystal on silicon display is described in application Ser. No. 09/311,805, filed May 13, 1999, which is incorporated herein by reference.

Another preferred microdisplay is a spatial light modulator. Spatial light modulators, also known as light valves, are well known in the art for use in electronic displays. Examples of spatial light modulators that may be used in the display system of the present invention and their principle of operation are described in U.S. Pat. Nos. 4,638,309, 4,680, 579 issued to Ott, U.S. Pat. No. 5,287,215 issued to Warde. U.S. Pat. Nos. 4,441,791, 4,710,732, 4,596,992, 4,615,595, 4,662,746 and 5,061,049, 5,280,277 issued to Hornbeck, U.S. Pat. Nos. 5,287,096 and U.S. Pat. No. 5,170,283 issued to O'Brien, all of which are incorporated herein by reference.

According to one embodiment of the invention, the microdisplay 14 has an imaging surface 18 with an area equal to or less than about 400 mm², preferably between about 20 mm² and 400 mm² and more preferably between about 20 mm² and 100 mm². The pixels of the display matrix preferably have an area less than about 0.01 mm² and more preferably between 50 $\mu$m² and 500 $\mu$m². At these pixel and imaging surface 18 size ranges, the imaging surface 18 has a comparable number of pixels to that of a high resolution computer monitor.

D. EMBODIMENTS OF DISPLAY SYSTEM EMPLOYING DIFFERENT OPTICAL SYSTEMS

Figure 4A:
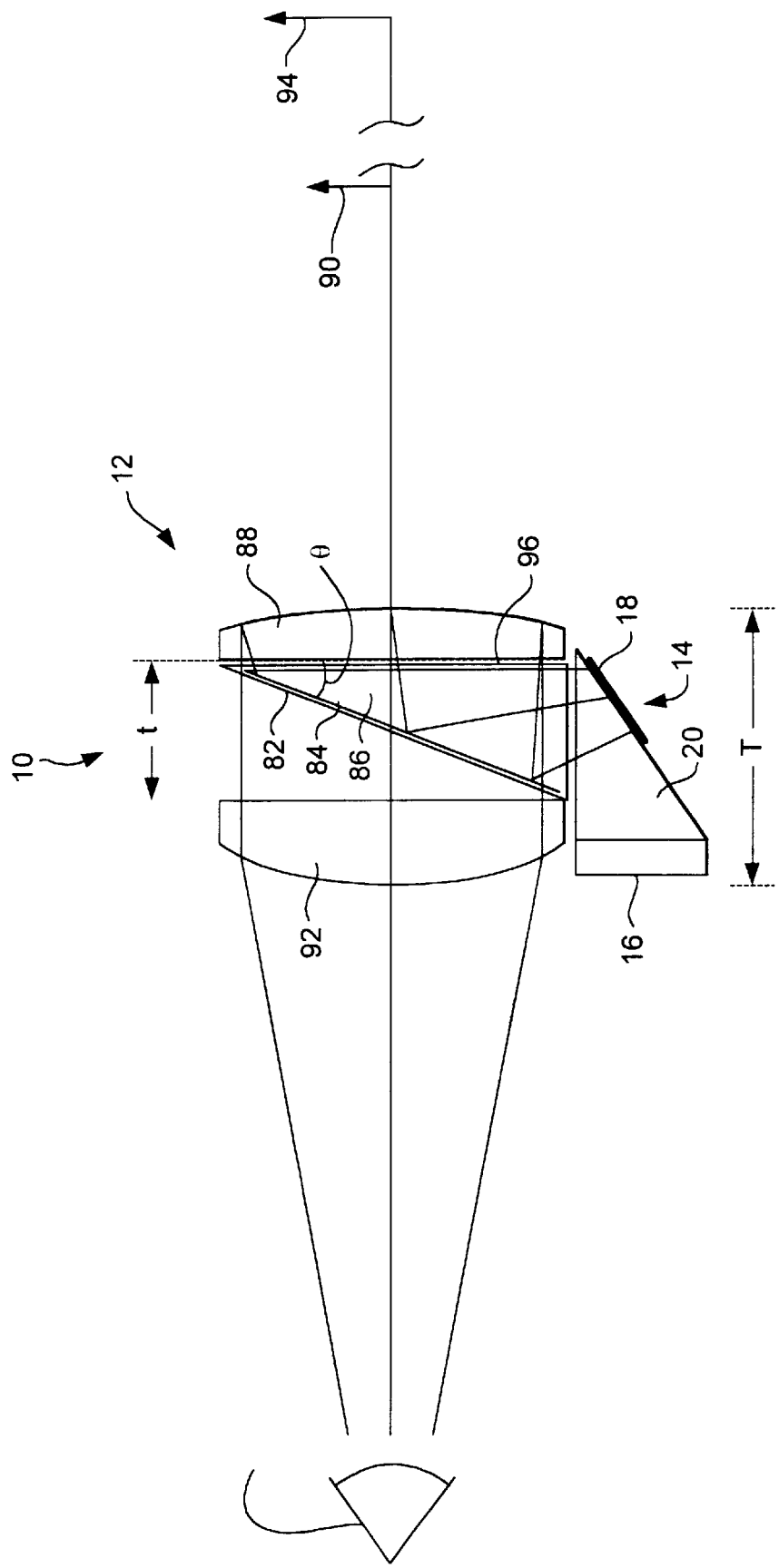
FIGS. 4A–4C illustrate an embodiment of an optical system employing an immersed beam splitting element.

FIG. 4A illustrates an embodiment of an optical system 12 which may be used with an illumination system and/or a light source system according to the present invention. As illustrated in FIG. 4A, the optical system 12 is positioned adjacent to a light source system 16 and an microdisplay 14. Light is reflected off the microdisplay 14 into the optical system 12. The optical system 12 includes an immersed beam splitting element 82 having a beam splitter 84 immersed in an optically transparent material 86. A portion of the light which reaches the beam splitter 84 is reflected by the beam splitter 84 and directed to a first optical element 88.

The first optical element 88 has a reflective function and a magnification function. The image formed by the light projected onto the first optical element 88 is magnified by the magnification function of the element to form a magnified virtual image 90. The light from the magnified virtual image 90 is reflected by the reflective function of the first optical element 88. At least a portion of the light forming the magnified virtual image 90 passes through the beam splitting element 82 to a second optical element 92. The magnified virtual image 90 projected onto the second optical element 92 is magnified by the second optical element 92 as the light traverses the second optical element 92 to form a compound magnified virtual image 94 which is seen by the user. The apparent position of the magnified virtual image 90 relative to the second optical element 92 is approximately equal to or less than the focal length of the second optical element 92. The compound magnified virtual image 94 appears to be positioned further away than the magnified virtual image 90, preferably at least 10 inches away. In one embodiment the compound magnified virtual image 94 is at least about 6 feet away to provide for comfortable viewing.

In order to prevent stray light from interfering with the user's ability to see the compound magnified virtual image 94 an anti-reflective coating can optionally be placed on the outside surface of the second optical element 92.

Figure 4B:
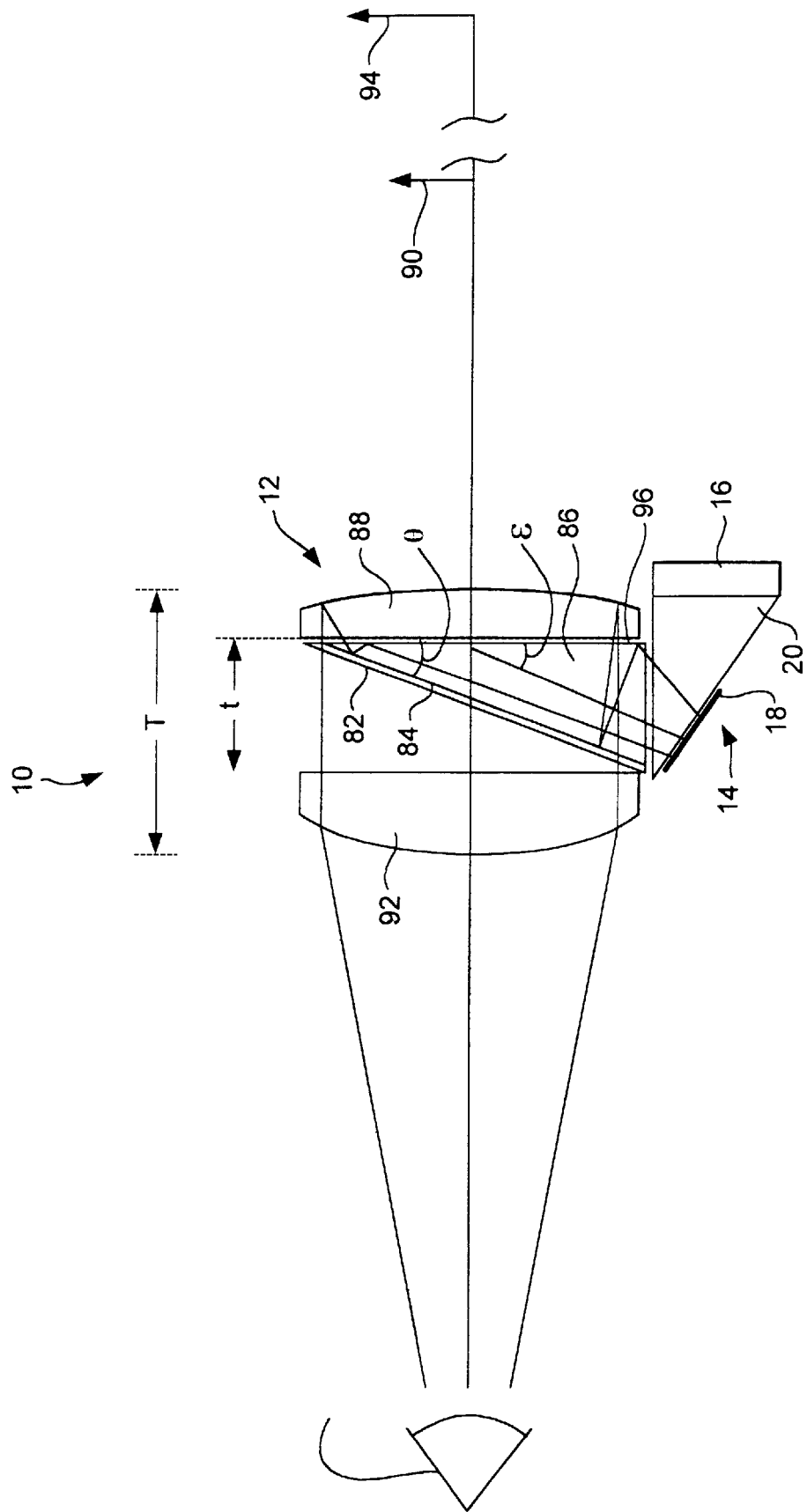

FIG. 4B illustrates an alternate embodiment of the optics system in which total internal reflection off a back surface 96 of the beam splitting element 82 is used to reduce the thickness of the optical system 12. Light from the image forming assembly is projected onto the back surface 96 of the beam splitting element 82. The image forming optics are angled such that the light reflected from the imaging surface 18 is incident the back surface 96 of the beam splitting element 82 at an angle, ε, less than the angle at which total internal reflection occurs. As a result, the light from the image forming assembly is reflected off the back surface 96 of the beam splitting element 82 to the beam splitter 84. The light is then reflected by the beam splitter 84 and directed to the first optical element 88.

The angle ε at which total internal reflection occurs depends on the refractive index material used to form the immersed beam splitting element 82, as well as whether a film is placed on the back surface 96 of the beam splitting element 82. In one embodiment, angle ε is less than about 60°.

As in the embodiment illustrated in FIG. 4A, first optical element 88 has a reflective function and a magnification function. The image formed by the light projected onto first optical element 88 is magnified by the magnification function of the element to form a magnified virtual image 90. The light from the magnified virtual image 90 is reflected by the reflective function of the element. At least a portion of the light forming the magnified virtual image 90 passes through the beam splitting element 82 to a second optical element 92. The magnified virtual image 90 formed by the light projected onto the second optical element 92 is magnified by the second optical element 92 as the light traverses the second optical element 92 and is seen as a compound magnified virtual image 94 by the user.

As illustrated in FIGS. 4A and 4B, the beam splitter 84 is positioned relative to a plane 97 of the first optical element 88 to direct light from the imaging surface 18 onto the first optical element 88. The apparent position of the magnified virtual image 90 relative to the second optical element 92 is approximately equal to or less than the focal length of the second optical element 92. The compound magnified virtual image 94 appears to be positioned further away than the magnified virtual image 90, preferably at least 10 inches away. In one embodiment the compound magnified image is at least about 6 feet away to provide for comfortable viewing. The angle θ between the beam splitter 84 and the plane 97 of the first optical element 88 limits how close the first optical element 88 and the second optical elements 92 may be positioned relative to each other (shown in FIGS. 4A and 4B as distance t) and hence limits the overall thickness T of the optical system 12.

According to this embodiment. the separation that is required between the first optical element 88 and the second optical element 92 is reduced by using immersed beam splitter 84. i.e., a beam splitter 84 which is contained within one or more optically transparent materials 86 which have a refractive index higher than air. By using an immersed beam splitter 84, light passes between the imaging surface 18 and the beamsplitting element 82 through a medium having a higher refractive index than air. The higher refractive index medium causes the source object projected from the imaging surface 18 to be magnified in comparison to an image of the source object which passes between the imaging surface 18 and the beamsplitting element 82 through air. The magnification performed by the beamsplitting element 82 enables a smaller beamsplitting element 82 to be used in the optical system 12, which, in turn, enables the beamsplitting element 82 to be positioned at a tighter angle θ. By reducing the angle θ at which the beamsplitting element 82 is positioned, the distance t between the first optical element 88 and the second optical element 92 is reduced.

In the embodiment of the optical system 12 illustrated in FIG. 4A, the angle θ between the beam splitter 84 and the plane 97 of the first optical element 88 is preferably about 30–45° and more preferably about 37°. In the embodiment of the optical system 12 illustrated in FIG. 4B, the angle θ between the beam splitter 84 and the plane 97 of the first optical element 88 is preferably about 10–30° and more preferably about 25°. Thus, total internal reflection can reduce the angle θ between the beam splitter 84 and the plane 97 of the first optical element 88 and accordingly the reduce the separation between the first optical element 88 and the second optical element 92.

The use of an immersed beam splitter 84 also enables a smaller imaging surface 18 to be used and/or for the imaging surface 18 to be positioned further away from the beam splitter 84 than if the source object were projected from the imaging surface 18 to the beam splitter 84 through air. This is important to the compact design of a display system 10 according to the present invention since it enables the imaging surface 18 to be positioned out from between optical elements and thus out of the field of view provided by the optical system.

Figure 4C:
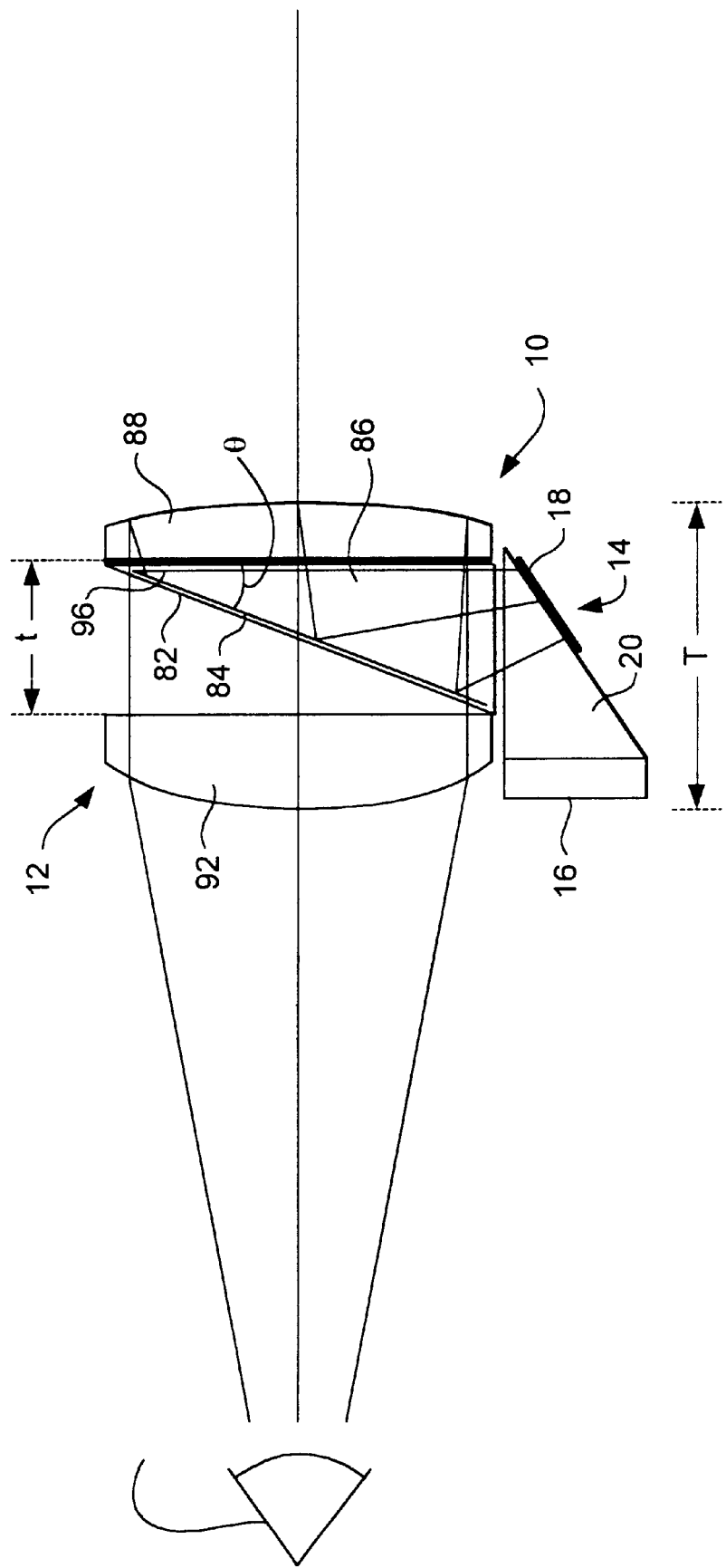

As illustrated in FIG. 4C, a polarization modifier 98, such as a quarter waveplate. can be positioned between the beam splitter 84 and the reflective first optical element 88 in this embodiment. The polarization modifier 98 serves to alter the polarization of the light which traverses the polarization modifier 98 before and after being reflected off the first optical element 88. By using the polarization modifier 98, polarized light from the imaging surface 18 is reflected by the beam splitter 84, altered as it traverses the polarization modifier 98, reflected by the first optical element 88 and altered again by the polarization modifier 98 so that the light traverses the beam splitter 84 after being reflected off the first optical element 88.

It is noted that the optical system illustrated in regard to FIGS. 4A–4C are described in greater detail in U.S. Pat. No. 5,771,124 which is incorporated herein by reference.

Figure 5:
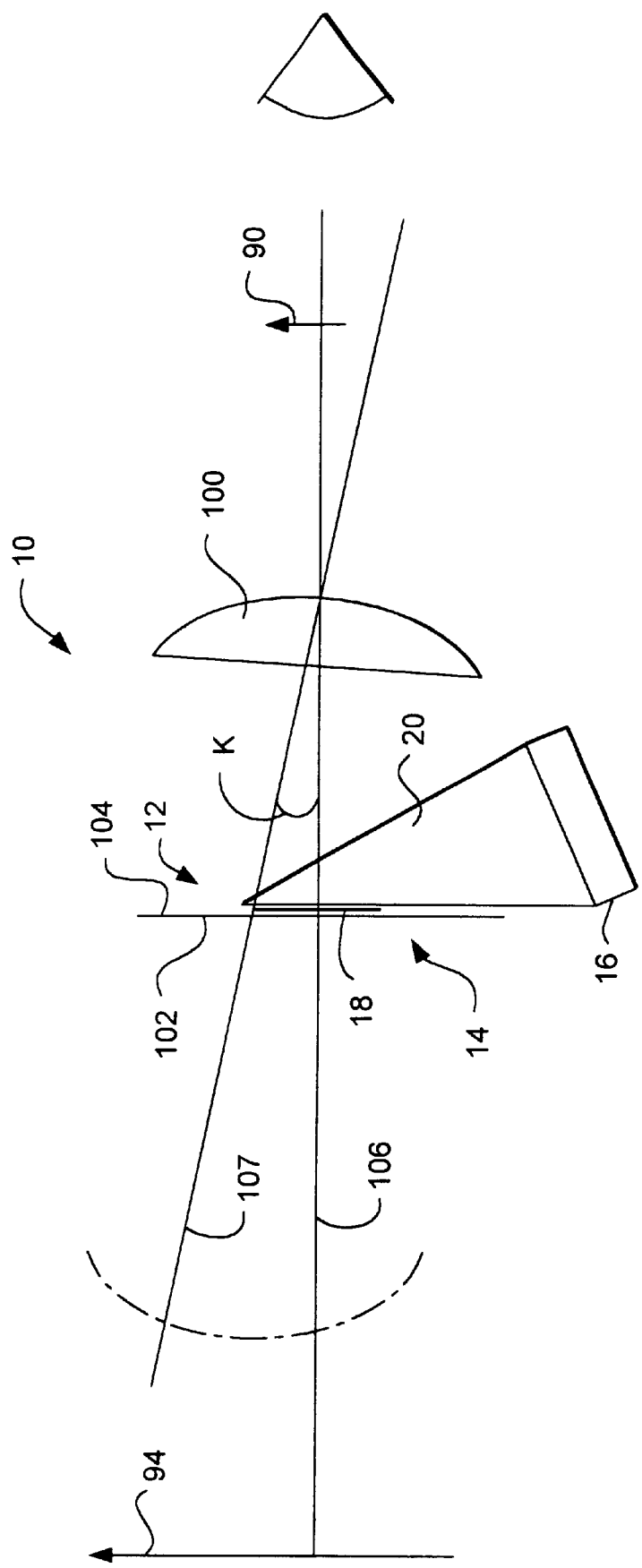
FIG. 5 illustrates an embodiment of an optical system employing a beamsplitting magnification optic.

FIG. 5 illustrates an alternate embodiment of an optical system 12 which may be used with an illumination system and/or a light source system according to the present invention. In this optical system, a beamsplitting magnification optic 100 remote from the imaging surface 18 and a reflective element 102 in proximity to the imaging surface 18 are employed. The beamsplitting magnification optic 100 is preferably positioned about 3–15 mm from the imaging surface 18 and more preferably about 5–10 mm from the imaging surface 18. Because the reflective element 102 provides a convenient support structure on which to mount the imaging surface 18, it is preferred that the imaging surface 18 be positioned adjacent to a reflective surface 104 of the reflective element 102 which is positioned opposite the beamsplitting magnification optic 100.

The centerpoint of imaging surface 18 and the centerpoint of the beamsplitting magnification optic 100 define a first optical axis 106 along which the source object is projected toward the beamsplitting magnification optic 100.

Incorporated into the beamsplitting magnification optic 100 is a magnification function and a reflection function such that the beamsplitting magnification optic 100 images the source object and reflects a magnified virtual image 90 of the source object toward the reflective element 102. The center of the imaging rays forming the reflected magnified virtual image 90 define a second optical axis 107 that is at an angle, κ, relative to the first optical axis 106. The angle between the first and second optical axes, κ, is preferably at most about 40'. more preferably at most about 10 and most preferably at most about 5°.

The beamsplitting magnification optic 100 also serves as a second magnification optic. More specifically, the light rays forming the magnified virtual image 90 are reflected off the reflective element 102 back toward the beamsplitting magnification optic 100 which then magnifies the magnified virtual image 90 to produce a compound magnified virtual image 94 of the source object to the user.

Displays having an optical system 12 similar to the optical system 12 of FIG. 5 have previously been described in greater detail in U.S. Pat. No. 5,625,372 which is incorporated herein by reference.

Figure 6:
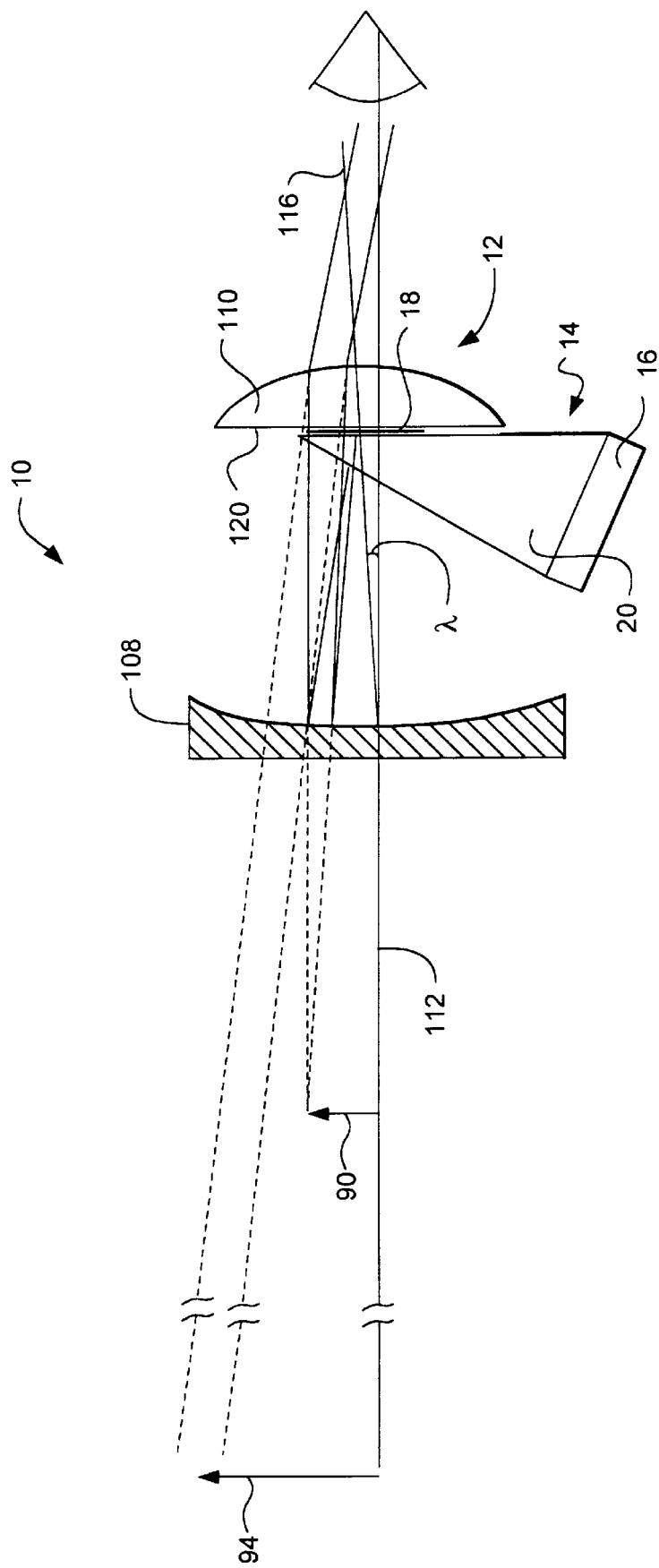
FIG. 6 illustrates an embodiment of an optical system employing a first magnification optic and a second magnification optic.

FIG. 6 illustrates an embodiment of an optical system 12 which employs a first magnification optic 108 and a second magnification optic 110. The first magnification optic 108 is positioned along a first optical axis 112 defined by the centerpoint of the imaging surface 18 and the centerpoint of the first magnification optic 108. A source object formed on the imaging surface 18 is projected toward the first magnification optic 108 and is centered upon the first optical axis 112.

Incorporated into the first magnification optic 108 is a magnification function and a reflection function such that the first magnification optic 108 images the source object and provides a magnified virtual image 90 of the source object in the direction of the user. The center of the imaging rays forming the magnified virtual image 90 define a second optical axis 116 that is at an angle, λ, relative to the first optical axis 112. The angle λ of the second optical axis 116 relative to the first optical axis 112 is equal to twice the tilt angle of the normal to the center of curvature of the first magnification optic 108 if the optic is tilted. This displacement angle, λ, is also equal to twice the distance of the normal to the center of curvature of the first magnification optic 108 divided by the radius of curvature of the first magnification optic 108 if the first magnification optic 108 is off center.

The second magnification optic 110 receives the magnified virtual image 90 and provides a compound magnified virtual image 94 of the source object to the user within the full field of view. The source object produced by the imaging surface 18 is within the full field of view of this second magnification optic 110. This generally requires that λ be at most about 40°, preferably at most about 10° and most preferably at most about 5°. These smaller angles can reduce the amount of aberrations in the compound magnified virtual image 94.

In the embodiment of FIG. 6. the imaging surface 18 is positioned adjacent to a distal refractive surface 120 of the second magnification optic 110. According to this embodiment, the source object produced by the imaging surface 18 is imaged by the first magnification optic 108 such that the first magnification optic 108 provides a magnified virtual image 90 of the source object where the imaging rays forming the magnified virtual image 90 have a center which defines the second optical axis 116. The second magnification optic 110 then reimages the magnified virtual image 90 and provides a compound magnified virtual image 94 of the source object to the observer.

When the imaging surface 18 is positioned near or adjacent to the distal refractive surface 120 of the second magnification optic 110, the first magnification optic 108 preferably has a magnification of about 3–10 and a focal length of about 7.5 and 30 mm and the second magnification optic 110 preferably has a magnification of about 3–10 and a focal length of about 25–83 mm. It is also preferred that the eye relief provided by the second magnification optic 110 be about 25 mm, most preferably equal to or greater than about 35 mm.

Displays having an optical system 12 similar to the optical system 12 of FIG. 6 have previously been described in greater detail in U.S. Pat. No. 5,625,372 which is incorporated herein by reference.

Figure 7A:
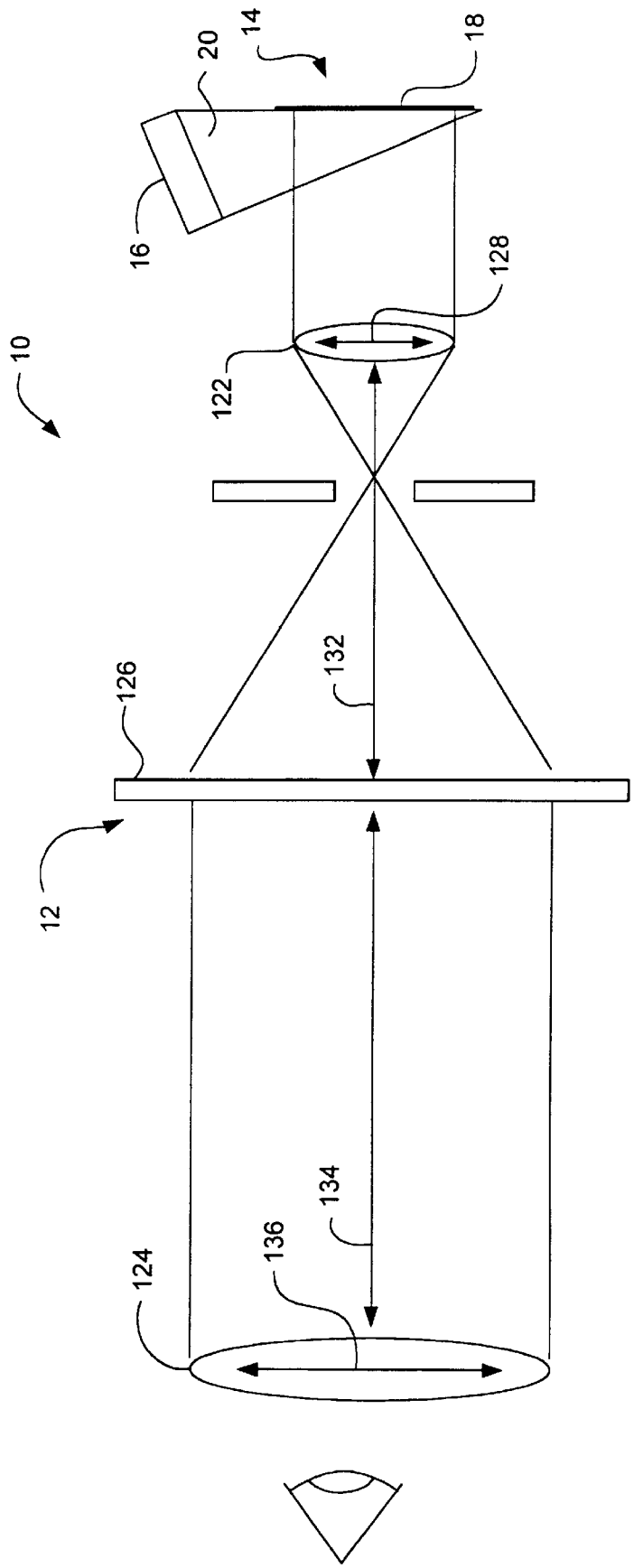
FIGS. 7A–7B illustrate an embodiment of an optical system employ ing a first magnification optic, a second magnification optic and an image synthesizing optic.

FIG. 7A illustrates another embodiment of an optical system 12 employing a first magnification optic 122, a second magnification optic 124 and an image synthesizing optic 126. A source object formed on the imaging surface 18 is magnified by the first magnification optic 122 to produce a magnified virtual image 128. The first magnification optic 122 preferably provides a magnification of at least about 3 and more preferably about 3–10. The first magnification optic 122 also preferably has an effective focal length of about 3.5–37.5 mm.

The magnified virtual image produced by the first magnification optic 122 is projected onto the image synthesizing optic 126 to produce a magnified real image 130. The distance between the first magnification optic 122 and the image synthesizing optic 126 is referred to as the first distance 132. The first distance is preferably about 35–150 mm. In general, the distance between a magnification optic and the point at which the image is projected equals the focal length (f) of the optic multiplied by the magnification (m) plus 1, i.e., $d=f^*(m+1)$. The upper limit of 150 mm corresponds to twice the preferred length of the container containing the optical system 12. It should be noted, however, that larger containers may be employed and thus larger first distances may be used.

The magnified real image 130 on the image synthesizing optic 126 is conveyed along a second distance 134 to the second magnification optic 124 which magnifies the magnified real image 130 to produce a magnified virtual image 136 which is seen by the user. The second distance is approximately equal to the focal length of the second magnification optic 124.

The second magnification optic 124 is used to provide the user with a magnified virtual image. It is preferred that the eye relief provided by the second magnification optic 124 be at least about 15 mm. more preferably at least about 35 mm and most preferably at least about 50 mm. The second magnification optic 124 preferably provides magnification by a factor of at least about 4, more preferably by a factor of about 4–7.

The first magnification optic 122 and the second magnification optic 124 combine to magnify the source object formed by the microdisplay by a factor of at least about 20 and more preferably at least about 40. The two magnification stages allows the optical system 12 of the present invention to employ smaller components and a more compact layout than is possible using the single magnification stage employed by projection systems.

A suitable image synthesizing optic 126 for the optical system 12 of FIG. 7A may be any device which produces a directly viewable image when placed in the real image plane of a magnification optic. As illustrated in FIG. 7A, the image synthesizing optic 126 may be a light transmissive image synthesizing optic 126 where the source object is imaged onto the rear surface of the image synthesizing optic 126 to produce a magnified real image 130. Alternatively, the magnified real image 130 may be projected onto a reflective image synthesizing optic 126 as illustrated in FIG. 7B.

The image synthesizing optic 126 is preferably designed such that a large fraction of the light is redirected so that the entirety of the image remains visible as the eye is moved laterally relative to the second magnification optic 124. In order to achieve the desired amount of light redirection, the numerical aperture of the directed light is preferably on the order of the (radius of the second magnification optic 124)/(focal length of the second magnification optic 124). In addition, the image synthesizing optic 126 should redirect the central ray of the cone of light from each point on the image synthesizing optic 126 to the center of the second magnification optic.

Figure 7B:
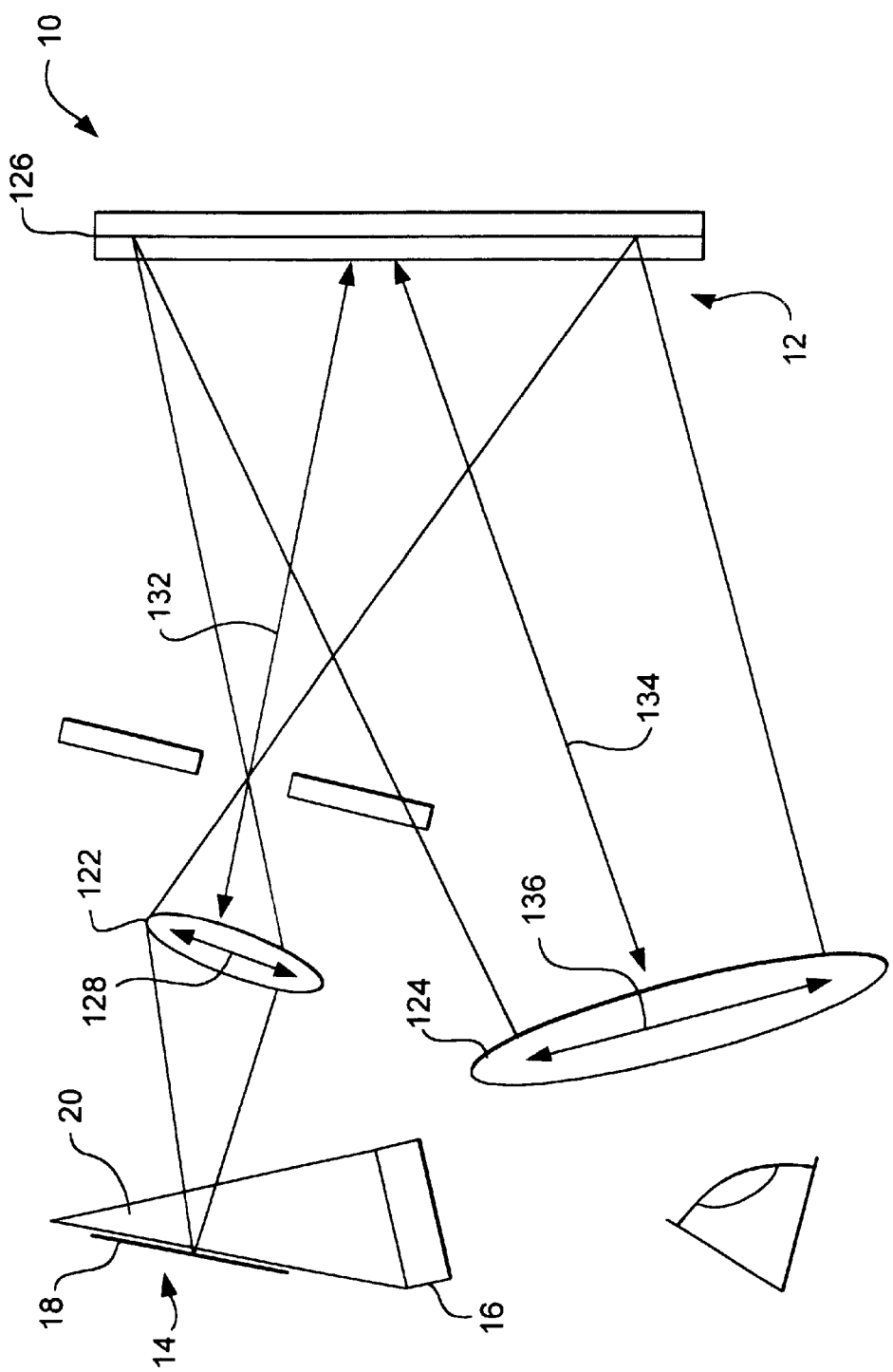

Displays having an optical system 12 similar to the optical system 12 of FIGS. 7A–7B have previously been described in greater detail in U.S. Pat. No. 5,644,323 which is incorporated herein by reference.

The various display systems of the present invention operate by delivering data to a processor which in turn controls the operation of microdisplay. In certain instances, for example when multiple color images are to be provided by the display system. operation of the light source system is also controlled. A wide variety of methods and systems are known in the art for operating a display system according to the present invention. U.S. application Ser. No. 09/311,805, filed May 13, 1999 provides one example of a system for operating a display system and is incorporated herein by reference. It should be understood, however, that a wide variety of other systems and methods for operating a display system are known, may be readily adapted for use with the present invention, and are intended to be encompassed by the present invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A virtual image display system comprising:
    a non-emissive, reflective microdisplay which forms a source object;
    an optical system which forms a magnified, virtual image of the source object from light reflected off the microdisplay;
    a light source system which produces light to illuminate the microdisplay; and
    an illumination system which forms at least two virtual light sources to illuminate the microdisplay.

2. A virtual image display system according to claim 1 wherein the at least two virtual light sources include a first virtual light source positioned approximately in front of and directly over the microdisplay and second virtual light source positioned over and to one side of the microdisplay.

3. A virtual image display system according to claim 2 wherein the optical system has a folded optical path which is aligned within an optical plane, the first and second virtual light sources being aligned with the optical plane.

4. A virtual image display system according to claim 1 wherein the illumination system forms at least three virtual light sources to illuminate the display system.

5. A virtual image display system according to claim 4 wherein the at least three virtual light sources include a first virtual light source positioned approximately in front of and directly over the microdisplay, a second virtual light source positioned over and to a first side of the microdisplay, and a third virtual light source positioned over and to second side of the microdisplay.

6. A virtual image display system according to claim 4 wherein the optical system has a folded optical path which is aligned within an optical plane, the first, second and third virtual light sources being aligned with the optical plane.

7. A virtual image display system according to claim 1 wherein the illumination system comprises an illumination body which forms the at least two virtual light sources.

8. A virtual image display system according to claim 7 wherein the illumination body comprises a prism which forms the at least two virtual light sources.

9. A virtual image display system according to claim 8 wherein the light source system is positioned adjacent a first surface of the prism, the microdisplay is positioned adjacent a second surface of the prism, and the optical system is positioned adjacent a third surface of the prism.

10. A virtual image display system according to claim 9 wherein the light source system produces polarized light and the third prism surface is attached to a reflective polarizer.

11. A virtual image display system according to claim 9 wherein the angle between the third prism surface and the second prism surface is less than 45 degrees.

12. A virtual image display system according to claim 9 wherein the angle between the third prism surface and the second prism surface is between 20 and 35 degrees.

13. A virtual image display system according to claim 9 wherein the angle between the first prism surface and the second prism surface is between about 1.7 and 2.3 times the size of the angle between the third prism surface and the second prism surface.

14. A virtual image display system comprising:
a non-emissive, reflective microdisplay which forms a source object;
an optical system which forms a magnified, virtual image of the source object from light reflected off the microdisplay;
a light source system which produces light to illuminate the display system; and
an illumination system which directs light from the light source system through the illumination system to the microdisplay such that the angles of incidence of light which illuminates the microdisplay varies across the microdisplay over an angular range that is greater than would be provided by the light source system if the light source system were to directly illuminate the microdisplay.

15. A virtual image display system comprising:
a non-emissive, reflective microdisplay which forms a source object;
an optical system which forms a magnified, virtual image of the source object from light reflected off the microdisplay;
a light source system which produces light to illuminate the microdisplay; and
an illumination system which directs light from the light source system through the illumination system to the microdisplay such that the angles of incidence of light which illuminates the microdisplay varies across the microdisplay over an angular range of at least 40 degrees.

16. A virtual image display system according to claim 15 wherein the angles of incidence of light which illuminates the display system vary over an angular range of at least 60 degrees.

17. A virtual image display system according to claim 15 wherein the angles of incidence of light which illuminates the display system vary over an angular range of between about 40 degrees and 120 degrees.

18. A virtual image display system according to claim 15 wherein the angles of incidence of light which illuminates the display system vary over an angular range of between about 60 degrees and 100 degrees.

19. A virtual image display system comprising:
a non-emissive, reflective microdisplay which forms a source object;
an optical system which forms a magnified, virtual image of the source object from light reflected off the microdisplay;
a light source system which produces light to illuminate the microdisplay; and
an illumination system which directs light from the light source system through the illumination system to the microdisplay such that a first portion of the light incident on the microdisplay is approximately perpendicular to the microdisplay, a second portion of the light incident on the microdisplay is positively angularly displaced relative to the perpendicular to the microdisplay, and a third portion of the light incident on the microdisplay is negatively angularly displaced relative to the perpendicular to the microdisplay.

20. A virtual image display system comprising:
a non-emissive, reflective microdisplay which forms a source object;
an optical system which forms a magnified, virtual image of the source object from light reflected off the microdisplay;
a light source system which generates light to illuminate the microdisplay; and
an illumination system which includes an illumination body which transmits light from the light source system to the display system to illuminate the display system where a first portion of the light is internally reflected off one surface of the illumination body prior to illuminating the display system and a second portion of the light is internally reflected off two surfaces of the illumination body prior to illuminating the display system.

21. A virtual image display system according to claim 20 wherein at least one of the internal reflections is a totally internal reflection.

22. A virtual image display system according to claim 20 wherein the first portion of light from the light source traverses the illumination body by being internally reflected off of a surface of the illumination body adjacent the optical system prior to reaching the microdisplay.

23. A virtual image display system according to claim 20 wherein the second portion of light from the light source traverses the illumination body by being internally reflected off of a surface of the illumination body adjacent the microdisplay, then internally reflected off of a surface of the illumination body adjacent the optical system prior to reaching the microdisplay.

24. A virtual image display system according to claim 20 where a third portion of the light is internally reflected off three surfaces of the illumination body prior to illuminating the display system.

25. A virtual image display system comprising:
a non-emissive, reflective microdisplay which forms a source object;
an optical system which forms a magnified, virtual image of the source object from light reflected off the microdisplay;
a light source system which generates light to illuminate the microdisplay; and
an illumination system which includes an illumination body which transmits light from the light source system to the microdisplay to illuminate the microdisplay, the light source system being positioned adjacent a first surface of the illumination body, the microdisplay being positioned adjacent a second surface of the illumination body, and the optical system being positioned adjacent a third surface of the illumination body, where a portion of the light from the light source traverses the illumination body by being internally reflected off the third surface of the illumination body.

26. A virtual image display system according to claim 25 wherein at least one of the internal reflections is a totally internal reflection.

27. A virtual image display system according to claim 25 wherein a portion of the light from the light source traverses the illumination body by being internally reflected off the second surface of the illumination body and then internally reflected off the third surface of the illumination body.

28. A virtual image display system according to claim 25 wherein a first portion of the light from the light source traverses the illumination body by being internally reflected off the third surface of the illumination body, and a second portion of the light from the light source traverses the illumination body by being internally reflected off the second surface of the illumination body and then internally reflected off the third surface of the illumination body.

29. A virtual image display system according to claim 25 wherein a first portion of the light from the light source traverses the illumination body by being internally reflected off the third surface of the illumination body, a second portion of the light from the light source traverses the illumination body by being internally reflected off the second surface of the illumination body and then internally reflected off the third surface of the illumination body, and a third portion of the light from the light source traverses the illumination body by being internally reflected off the third surface of the illumination body, then internally reflected off the second surface of the illumination body, and then internally reflected off the third surface of the illumination body.

30. An optical method comprising:
    directing a source object within a first optical element to a surface of the first optical element where the source object is internally reflected;
    directing the source object to a beamsplitter which reflects the source object;
    directing the source object to a second optical element which magnifies and reflects the source object to form a magnified virtual image of the source object; and
    directing the magnififed virtual image throught the beamsplitter.

31. The optical method according to claim 30, the method futher including forming the source object using a microdisplay.

32. The optical method according to claim 30, wherein the first optical element is formed of an optically transparent material which has a refractive index of at least about 1.3.

33. The optical method according to claim 30, wherein the source object is directed to the internally reflecting surface of the first optical element at an angle of at least about 30 degrees.

34. The optical method according to claim 31 wherein the microdisplay is a non-emissive, reflective microdisplay.

35. The optical method according to claim 31 wherein the microdisplay imaging surface with an area equal to or less than 400 mm².

36. A compact virtual image display system comprising:
    a microdisplay for forming a source object;
    an optic formed of an optically transparent material and including a surface positioned such that at least a portion of light forming the source object is totally internally reflected by the surface;
    a reflective first magnification optic positioned such that the light totally internally reflected source object within the optic magnified and reflected as a magnified virtual image;
    a light source; and
    an illumination system which directs light from the light source to the microdisplay, the illumination system comprising a prism where at least a portion of light from the light source is internally reflected within the prism prior to exiting the prism and illuminating the microdisplay.

37. The virtual image display system according to claim 36 wherein the internal reflection of light from the light source is a totally internal reflection.

38. A compact virtual image display system comprising:
    a microdisplay for forming a source object;
    an optic formed of an optically transparent material and including a surface positioned such that at least a portion of light forming the source object is totally internally reflected by the surface; and
    a reflective first magnification optic positioned such that the totally internally reflected source object within the optic is magnified and reflected as a magnified virtual image.

39. The virtual image display system according to claim 38 wherein the optic formed of an optically transparent material has a refractive index of at least about 1.3.

40. The virtual image display system according to claim 38 wherein the microdisplay projects the light which is totally internally reflected to the surface at an angle of at least about 30 degree.

41. The virtual image display system according to claim 38, further including an illumination source for projecting light to the microdisplay.

42. The virtual image display system according to claim 38 wherein the microdisplay is a non-emissive, reflective microdisplay.

43. The virtual image display system according to claim 38 wherein the microdisplay imaging surface with an area equal to or less than 400 mm².

44. An optical method comprising:
    directing a source object within a first optical element to a surface of the first optical element wherein the source object is internally reflected;
    directing the source object within the first optical element to a surface of the first optical element which magnifies and reflects the source object to form a magnified virtual image of the source object; and
    directing the magnified virtual image through the beamsplitter out of the first optical element.

45. The optical method according to claim 44, the method further including forming the source object using a microdisplay.

46. The optical method according to claim 44, wherein the first optical element is formed of an optically transparent material which has a refractive index of at least about 1.3.

47. The optical method according to claim 44, wherein the source object is directed to the internally reflecting surface of the first optical element at an angle of at least about 30 degrees.

48. The optical method according to claim 45 wherein the microdisplay is a non-emissive, reflective microdisplay.

49. The optical method according to claim 45 wherein the microdisplay imaging surface with an area equal to or less than 400 mm².

50. A compact virtual image display system comprising:
    a microdisplay for forming a source object; and
    a reflective first magnification optic including
    a first surface positioned such that at least a portion of light forming the source object thravels within the optic and is totally internally reflected by the first surface, and
    a second surface having a magnification and a reflection function which magnifies and reflects the totally internally reflected source object as a magnified virtual image.

51. The virtual image display system according to claim 50 wherein the optic formed of an optically transparent material has a refractive index of at least about 1.3.

52. The virtual image display system according to claim 50 wherein the microdisplay is a non-emissive, reflective microdisplay.

53. The virtual image display system according to claim 50 wherein the microdisplay imaging surface with an area equal to or less than 400 mm².

54. The virtual image display system according to claim 50 wherein the microdisplay projects the light which is totally internally reflected to the surface at an angle of at least about 30 degrees.

55. The virtual image display system according to claim 50, further including an illumination source for projecting light to the microdisplay.

56. A compact virtual image display system comprising:
   a microdisplay for forming a source object;
   a reflective first magnification optic including
      a first surface positioned such that at least a portion of light forming the source object ravels within the optic and is totally internally reflected by the first surface, and
      a second surface having a magnification and a reflection funtion which magnifies and reflects the totally internally reflected source object as a magnified virtual image;
   a light source; and
   an illumination system which directs light from the light source to the microdisplay, the illumination system comprising a prism where at least a portion of light from the light source is internally reflected within the prism prior to exiting the prism and illuminating the microdisplay.

57. The virtual image display system according to claim 56 wherein the internal reflection of light from the light source is a totally internal reflection.

* * * * *